(12) United States Patent
Hill

(10) Patent No.: US 7,370,008 B1
(45) Date of Patent: *May 6, 2008

(54) ELECTRONIC CATALOG SYSTEM AND METHOD

(75) Inventor: Charles E. Hill, Lynn, IN (US)

(73) Assignee: Charles E. Hill & Associates, Inc., Marshall, TX (US)

( * ) Notice: Subject to any disclaimer, the term of this patent is extended or adjusted under 35 U.S.C. 154(b) by 54 days.

This patent is subject to a terminal disclaimer.

(21) Appl. No.: 11/244,619

(22) Filed: Oct. 6, 2005

Related U.S. Application Data

(60) Continuation of application No. 09/618,744, filed on Jul. 18, 2000, now abandoned, which is a continuation of application No. 09/080,603, filed on May 18, 1998, now Pat. No. 6,131,088, which is a continuation of application No. 08/747,275, filed on Nov. 12, 1996, now Pat. No. 5,754,864, which is a division of application No. 08/460,913, filed on Jun. 5, 1995, now Pat. No. 5,761,649, which is a continuation of application No. 07/866,867, filed on Apr. 10, 1992, now Pat. No. 5,528,490.

(51) Int. Cl.
*G06F 17/30* (2006.01)
*G06F 9/44* (2006.01)

(52) U.S. Cl. .................. 705/27; 707/168; 707/170; 707/173

(58) Field of Classification Search ............ 705/26, 705/27; 707/104.1; 709/208–213; 713/191; 717/168–178
See application file for complete search history.

(56) References Cited

U.S. PATENT DOCUMENTS

| 4,514,815 | A | 4/1985 | Anderson |
| 4,528,643 | A | 7/1985 | Feeny, Jr. |
| 4,558,413 | A | 12/1985 | Schmidt et al. |
| 4,597,058 | A | 6/1986 | Izumi et al. |
| 4,630,234 | A | 12/1986 | Holly |
| 4,641,274 | A | 2/1987 | Swank |
| 4,658,093 | A | 4/1987 | Hellman |
| 4,714,996 | A | 12/1987 | Gladney et al. |
| 4,748,561 | A | 5/1988 | Brown |
| 4,794,519 | A | 12/1988 | Koizumi et al. |
| 4,827,399 | A | 5/1989 | Shibayama |
| 4,845,665 | A | 7/1989 | Heath et al. |
| 4,849,879 | A | 7/1989 | Chinnaswamy et al. |
| 4,858,114 | A | 8/1989 | Heath et al. |

(Continued)

FOREIGN PATENT DOCUMENTS

EP 84441 A2 * 7/1983

(Continued)

OTHER PUBLICATIONS

IBM Technical Disclosure Bulletin, Dec. 1983, vol. 26; issue No. 7B; p. No. 3918-3919, Dec. 1, 1983 (Cross reference:0018-8689-26-7B-3918).*

(Continued)

*Primary Examiner*—Yogesh C. Garg
(74) *Attorney, Agent, or Firm*—Baker & Daniels LLP

(57) ABSTRACT

A method is provided for detecting pirated copies of a serialized software program located on a remote computer.

25 Claims, 19 Drawing Sheets

U.S. PATENT DOCUMENTS

| | | |
|---|---|---|
| 4,866,611 A | 9/1989 | Cree et al. |
| 4,974,149 A | 11/1990 | Valenti |
| 4,984,155 A | 1/1991 | Geier et al. |
| 4,992,940 A | 2/1991 | Dworkin |
| 5,019,963 A | 5/1991 | Alderson et al. |
| 5,023,907 A | 6/1991 | Johnson et al. |
| 5,103,476 A | 4/1992 | Waite et al. |
| 5,117,354 A | 5/1992 | Long et al. |
| 5,138,712 A | 8/1992 | Corbin |
| 5,155,847 A | 10/1992 | Kirouac et al. |
| 5,182,170 A | 1/1993 | Marcus et al. |
| 5,257,377 A * | 10/1993 | Sathi et al. ............... 717/170 |
| 5,287,407 A * | 2/1994 | Holmes ................. 705/58 |
| 5,319,542 A | 6/1994 | King, Jr. |
| 5,423,033 A | 6/1995 | Yuen |
| 5,528,490 A | 6/1996 | Hill |
| 5,754,864 A | 5/1998 | Hill |

FOREIGN PATENT DOCUMENTS

| | | | |
|---|---|---|---|
| GB | 2 105 075 | | 3/1983 |
| GB | 2203571 A | * | 10/1988 |
| JP | 04232530 A | * | 8/1992 |

OTHER PUBLICATIONS

IBM Technical Disclosure Bulletin, Oct. 1984, vol. 27; issue No. 5; p. No. 3013, Oct. 1, 1984 (Cross reference:0018-8689-27-5-3013).*

* cited by examiner

VENDOR'S COMPUTER

ELECTRONIC CATALOG SYSTEM AND METHOD

This application is a continuation of application Ser. No. 09/618,744, filed Jul. 18, 2000, now abandoned, which is a continuation of application Ser. No. 09/080,603, filed May 18, 1998, now U.S. Pat. No. 6,131,088, which is a continuation of application Ser. No. 08/747,275, filed Nov. 12, 1996, now U.S. Pat. No. 5,754,864, which is a divisional of application Ser. No. 08/460,913, filed Jun. 5, 1995, now U.S. Pat. No. 5,761,649, which is a continuation of U.S. application Ser. No. 07/866,867, filed Apr. 10, 1992, now U.S. Pat. No. 5,528,490. The disclosures of all these related applications and patents are incorporated by reference herein.

BACKGROUND AND SUMMARY OF THE INVENTION

The present invention relates to an electronic catalog system. More particularly, the present invention relates to an improved electronic catalog system capable of providing a customer at a remote location with accurate updated product information from a vendor each time the customer uses the electronic catalog system.

There are two common types of system architecture that are commonly used in conventional electronic catalog systems. One common system is a dial-up system. The dial-up system includes a remote computer at a customer location with modem capabilities and a main computer at the vendor's location. The customer uses his computer to log on to the vendor's computer as a user. The customer can then browse through a catalog menu on the vendor's computer. The primary disadvantage of a dial-up system is that graphics data cannot be transmitted from the vendor's computer to the customer's computer in a meaningful time frame. It takes a large amount of time to transmit graphics data over telephone lines via a modem, especially if high resolution is desired. Therefore, the dial-up system is not practical for catalogs which include both graphics data and textual data.

A second common electronic catalog system is a system which is located totally on the customer's computer. The data in the customer's computer is periodically updated by the vendor by sending updated data disks. The primary disadvantage of this catalog system is that the data is rarely totally accurate. The accuracy of the data depends on the vendor sending updated data disks to the customer. In addition, the customer must also take the time to install the latest updated data disk onto his computer.

The electronic catalog system of the present invention is designed to reduce the problems associated with the above-mentioned catalog systems. The electronic catalog system of the present invention includes software on the customer's computer and software on the vendor's computer. Therefore, the present electronic catalog system provides a total system architecture. The software handles all communications between the customer's computer and vendor's computer. The customer's computer cooperates with vendor's computer to provide the customer with accurate updated catalog information each time the catalog system is used.

Catalog data is stored on both the vendor's computer and the customer's computer. The vendor's computer contains variable data related to each of the catalog products. Variable data is data that can change at any time. Changes in the variable data can affect the design integrity of the customer's product in which the data is being used. The customer's computer contains all constant data related to the catalog products. Constant data includes both graphics data and textual data. For instance, the customer's computer may include high resolution graphics data illustrating the various catalog items in detail. The customer's computer also includes constant textual data such as a dimensional data layout. Dimensions of the products and cost information are typically considered variable data stored on vendor's computer. If variable data changes, the vendor corrects the variable data entered into vendor's computer. The present invention automatically provides the customer with updated variable data from the vendor's computer without the need to load new data disks onto the customer's computer.

One object of the present invention is to provide the customer with an instantaneous distribution of the latest catalog data available. In operation, the customer browses through general catalog data residing on the customer's computer and determines the exact catalog data required. For example, the customer can select a specific product from a list of products on the customer's computer. Once the desired catalog data has been selected, the electronic catalog system automatically calls the vendor's computer and logs on. The catalog system first checks to determine whether any of the constant data on the customer's computer requires updating. If a constant data update is required, this update is completed prior to filling the customer's request for information. Once the constant data is updated, if necessary, vendor's computer transmits variable data related to the specific product selected by the customer. In addition, vendor's computer transmits a map to the customer's computer which permits the customer's computer to integrate the variable data received from the vendor's computer with constant data related to the selected product stored in the customer's computer. Therefore, a combination of constant data residing on the customer's computer and variable data downloaded from vendor's computer is integrated or merged to create a completely updated data sheet for the selected product. The variable data downloaded from vendor's computer includes the most recent data entered by the vendor. Therefore, the variable data is accurate, and the electronic catalog system of the present invention generates catalog information based only upon the latest vendor data. Advantageously, customers will have instant access to changes in variable data related to the products in the electronic catalog system.

Another object of the present invention is to minimize computer on-line time. A common disadvantage of conventional dial-up catalog systems is that a customer can log on to a vendor's computer and never log off. In other words, the customer has control over when to log on and when to log off vendor's computer. This can tie up vendor's computer for long periods of time. To overcome this disadvantage, conventional catalog systems often depend on a time out to automatically log the customer off the vendor's computer.

In the electronic catalog system of the present invention, the customer does not have the privilege of determining when to log on or when to log off the vendor's computer. The catalog system of the present invention automatically determines when it is necessary to log on to vendor's computer to retrieve additional data. Because all of the general catalog data is resident on the customer's computer, the normal browsing the user might do is accomplished locally at the customer's computer. The customer's computer automatically connects itself to vendor's computer and automatically requests the needed information only after the desired product has been selected from data on the customer's computer. The customer's computer automatically logs off vendor's computer after the requested data is received. Therefore, the electronic catalog system of the present invention typically reduces the on-line time by about 70-80%.

Yet another object of the present invention is to increase system security. System security is a serious problem that confronts any company that allows others to have access to data residing on its computer system. In conventional catalog systems, a customer can log on to a vendor's computer to access information. It is often possible for a computer hacker to discover a password and gain access to the system. This can cause damage to the system and provide the computer hacker access to confidential information. In the electronic catalog system of the present invention, the software controls when the customer's computer must log on to vendor's computer. In addition, the customer's computer automatically logs off vendor's computer after the required information is downloaded. Therefore, the present catalog system reduces customer access to vendor's computer system. This increases system security.

According to one aspect of the present invention, a method is provided for producing information related to a selected product on a remote computer. The method includes the steps of storing and maintaining variable data and constant data related to a plurality of products in a memory of a main computer and storing constant data related to a plurality of products in a memory of a remote computer. The method also includes the steps of selecting a product from the remote computer memory for which product information is desired, comparing constant data revision status in the memory of the main computer with constant data revision status in the memory of the remote computer, and updating constant data in the memory of the remote computer with constant data stored in the memory of the main computer that is different from the constant data stored in the memory of the remote computer. The method further includes the step of transmitting variable data related to the selected product from the main computer to the remote computer, and integrating constant data stored in the memory of the remote computer associated with the selected product with the variable data received from the main computer to provide product information related to the selected product including both constant and variable data.

The method for producing information related to a selected product on a remote computer still further includes the steps of automatically connecting the remote computer to the main computer after the selecting step, and automatically disconnecting the remote computer from the main computer after the variable data related to the selected product is transmitted from the main computer to the remote computer. In addition, the method includes the step of transmitting a map from the main computer to the remote computer along with the variable data to permit the remote computer to perform the integrating step. The method may also include the step of displaying or printing the information related to the product generated by the remote computer during the integrating step. In a preferred embodiment of the present invention, the constant data stored in the memory of the main computer and the constant data stored in the memory of the remote computer includes both graphics data and textual data.

According to another aspect of the present invention, the method for producing information related to a selected product on a remote computer includes the steps of storing and maintaining a main revision status in the memory of the main computer and storing a remote revision status in the memory of the remote computer. The main revision status indicates the revision level of the constant data stored in the main computer, and the remote revision status indicates the revision level and the constant data stored in the remote computer. The step of comparing constant data in the memory of the remote computer with constant data in the memory of the main computer includes the step of comparing the remote revision status with the main revision status maintained in the main computer.

The constant data updating step illustratively includes the steps of determining updated portions of the constant data stored in the main computer that are different than the constant data stored in the remote computer, transmitting the updated portions of the constant data stored in the main computer from the main computer to the remote computer, and replacing portions of the constant data stored on the remote computer with the updated portions of constant data received from the main computer. The constant data updating step also illustratively includes the step of transmitting a new remote revision status identical to the main revision status from the main computer to the remote computer.

According to yet another aspect of the present invention, a method is provided for installing a computer program on a remote computer. The method includes the steps of storing and maintaining a computer program on a main computer, generating registration data at the remote computer, and transmitting the registration data generated at the remote computer to the main computer. The method also includes the steps of creating an identification number at the main computer based on the registration data transmitted from the remote computer, transmitting the program from the main computer to the remote computer including the identification number, and storing the program and the identification number in the remote computer.

According to still another aspect of the present invention, a method is provided for automatically updating a program on a remote computer. The method includes the steps of storing a program and a remote program revision status in a memory of a remote computer, and maintaining the latest revisions of the program and a main program revision status in a memory of a main computer. The remote program revision status indicates the revision level of the program stored in the memory of the remote computer, and the main program revision status indicates the revision level of the program stored in the memory of the main computer. The method also includes the steps of transmitting the remote program revision status from the remote computer to the main computer, and comparing the remote program revision status to the main program revision status. The method further includes the step of updating portions of the program stored in the memory of the remote computer that are different from the program stored and maintained in the memory of the main computer.

The program updating step illustratively includes the steps of determining updated portions of the program stored in the main computer that are different from the program stored in the remote computer, transmitting the updated portions from the main computer to the remote computer, and replacing portions of the program stored on the remote computer with the updated portions received from the main computer. The remote revision status is transmitted to the main computer each time a communication session is initiated between the remote computer and the main computer. The program updating step also illustratively includes the step of transmitting a new remote program revision status identical to the main program revision status from the main computer to the remote computer.

According to still another aspect of the present invention, a method is provided for automatically detecting pirated copies of the software. The method includes the steps of storing and maintaining a computer program on a main computer, generating a unique serialization number, and transmitting the unique serial number generated by the main computer to the remote computer. The method also includes the step of maintaining serial number, serial number validation, registration data, and program revision status data by the main computer. The method also includes the transmitting of the program serial number and program revision status from the remote computer to the main computer, and the comparison of the serial number and program revision status transmitted from the remote computer to the serial number and program revision status maintained by the main computer.

According to a further aspect of the present invention, an electronic catalog system includes a main computer having a main memory for storing variable data and constant data related a plurality of products. The electronic catalog system also includes a remote computer having a remote memory for storing constant data related to a plurality of products. The electronic catalog system further includes means for transmitting a request for variable data related to a selected product from the remote computer to the main computer, means for comparing constant data in the remote memory with constant data in the main memory, means for determining which portions of the constant data stored in the main memory are different from the constant data stored in the remote memory, means for transmitting updated portions of the constant data stored in the main memory from the main computer to the remote computer, and means for replacing portions of the constant data stored in the remote memory with the updated portions of constant data received from the main computer. In addition, the electronic catalog system includes means for transmitting variable data related to the selected product stored in the main memory from the main computer to the remote computer, and means for integrating constant data related to the selected product stored in the remote memory with the variable data related to the selected product received from the main computer to generate information related to the selected product including both constant data and variable data. The electronic catalog system further includes means for automatically connecting the remote computer to the main computer, and means for automatically disconnecting the remote computer from the main computer after the variable data related to the selected product is transmitted from the main computer to the remote computer.

According to a further aspect of the present invention, the electronic catalog system includes means for storing and maintaining a main revision status in the memory of the main computer, and means for storing a remote revision status in the memory of the remote computer. The main revision status indicates the revision level of the constant data stored in the main computer. The remote revision status indicates the revision level of the constant data stored in the remote computer. The means for comparing constant data in the remote memory with constant data in the main memory compares the remote revision status with the main revision status maintained in the main computer. This revision level indicates which portions of the constant data have been updated.

According to another aspect of the present invention, a system for automatically updating a program stored in a remote computer includes a remote computer having a remote memory for storing a program and a remote program revision status. The remote program revision status indicates the revision level of the program stored in the remote memory. The system also includes a main computer having a main memory for storing the latest revisions of the program and a main program revision status. The main program revision status indicates the revision level of the program stored in the main memory. The system further includes means for transmitting the remote program revision status from the remote computer to the main computer, means for comparing the remote program revision status to the main program revision status, and means for determining which portions of the program stored in the main memory are different from the program stored in the remote memory. The system also includes means for transmitting updated portions of the program stored in the main memory from the main computer to the remote computer, means for replacing portions of the program stored in the remote memory with the updated portions of the program received from the main computer, and means for transmitting the new program revision status from the main computer to the remote computer.

According to a further aspect of the present invention, a system for installing a program on a remote computer includes a main computer including a main memory for storing a program. The system also includes means for generating registration data on a remote computer and means for transmitting the registration data generated at the remote computer from the remote computer to the main computer. The system further includes means for generating an identification number at the main computer based on the registration data transmitted from the remote computer, means for transmitting the program and the identification number from the main computer to the remote computer, and means for storing the program in the remote computer.

According to an additional aspect of the present invention, a system for detecting pirated copies of a serialized software program includes a remote computer including a remote memory for storing a program, a remote revision level, and a program serial number. The system also includes a main computer including a main memory for storing the program serial number, the remote revision level corresponding to the program serial number, and a validation code for a remote program corresponding to the serial number. The validation code indicates whether the program stored in the remote memory is valid or invalid. The system further includes means for transmitting the remote revision level and the program serial number stored in the remote memory from the remote computer to the main computer, and means for comparing the remote program revision level received from the remote computer to the remote program revision level stored in the main memory corresponding to the program serial number received from the remote computer. The system still further includes means for changing the validation code to indicate the serial number is invalid upon detection by the comparing means of a difference between the remote program revision level received from the remote computer and the remote program revision level stored in the memory of the main computer corresponding to the program serial number received from the remote computer. The system still further includes means for detecting whether the program stored in the remote memory is valid or invalid based upon the validation code corresponding to the program serial number received from the remote computer, and means for denying access to data stored in the memory of the main computer when the program corresponding to the serial number stored in the remote memory is invalid.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Before discussing the preferred embodiment of the present invention which is described and illustrated in detail with reference to FIGS. 1A-11, it should be noted that, although the invention will be discussed in terms of its applicability to an electronic catalog system for generating information including variable data and constant data related to a plurality of products, the broader aspects of the invention are not necessarily limited to this particular application. Although the preferred embodiment of the invention described below does offer particular advantages in the field of electronic catalog systems, it is felt that the adaptation and application of the invention to other fields will also be advantageous. Accordingly, the scope of the invention is not intended to be limited by the details of the preferred embodiment discussed below, but rather by the terms of the claims following this detailed description.

Figure 1A:
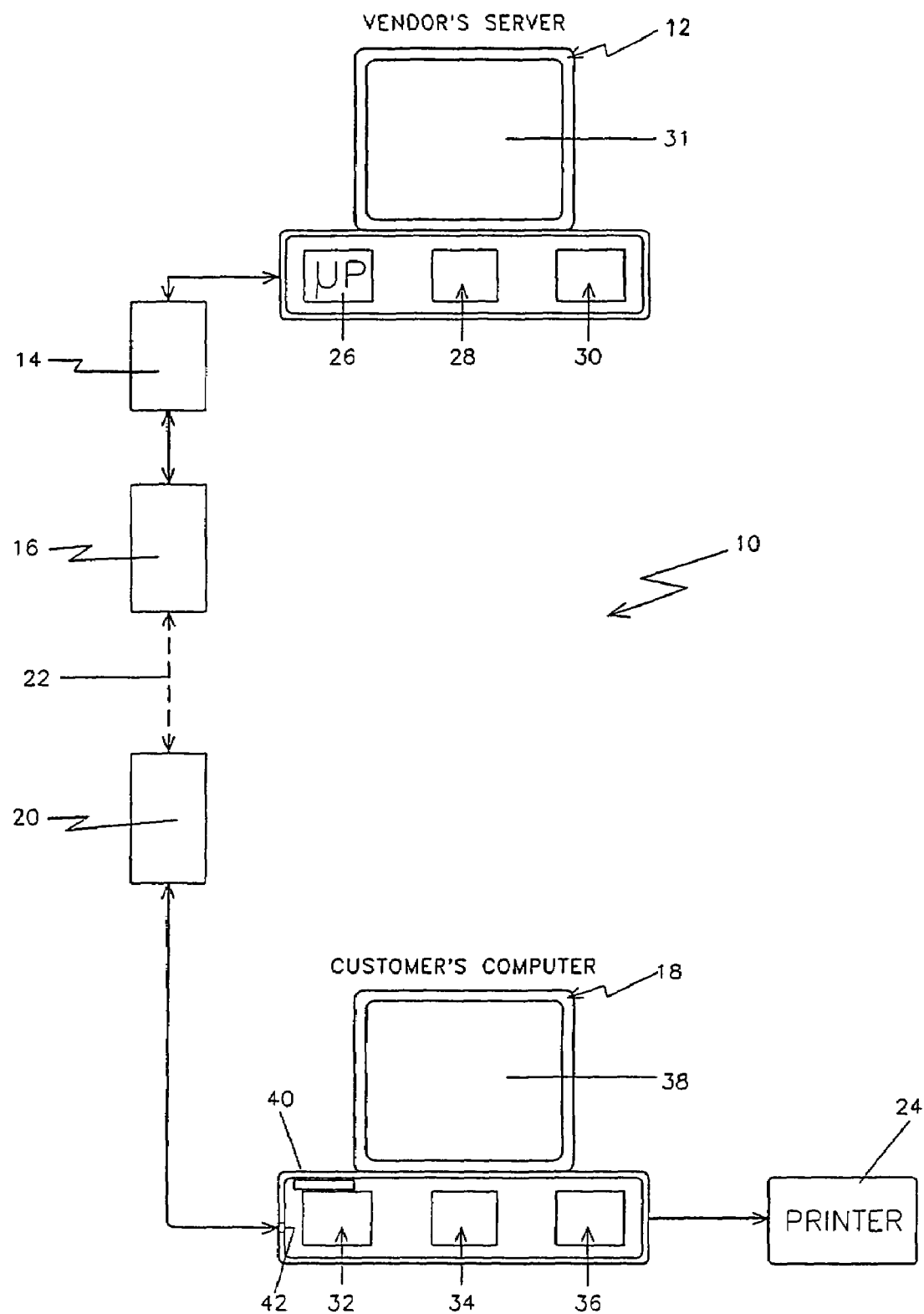
FIG. 1A is a diagrammatical view of the electronic catalog system of the present invention.

Referring now to the drawings, FIG. 1A illustrates a block diagram of the electronic catalog system 10 of the present invention. The electronic catalog system 10 is designed to provide a customer with catalog data which is current and updated with the most recent updates in vendor's catalog. The catalog system 10 includes a vendor's computer 12 located at the vendor's place of business. Illustratively, vendor's computer 12 is a COMPAQ SYSTEMPRO® available from the Compaq Computer Corporation.

Vendor's computer 12 is coupled to a multi-port intelligent communications array 14. Illustratively, communications array 14 is an Ultra INUX 1610A 16 port model available from Comtrol. Multi-port communications array 14 is coupled to a modem 16. Modem 16 is illustratively a model 2400SA available from Practical Peripherals. SCO UNIX V1386 release 3.2.2 operating system and Oracle Release 5.1.22.1 database system are used.

Catalog system 10 also includes a computer 18 located at a remote customer's location. Customer's computer 18 is illustratively a COMPAQ DESKPRO® available from Compaq Computer Corporation. A Microsoft DOS 5.0 operating system is used. Customer's computer 18 is coupled to a modem 20. Modem 20 is either 2400 baud or 1200 baud modem which is Hayes compatible. Modem 20 is illustratively a model 2400SA modem available from Practical Peripherals. Modem 16 at vendor's location communicates with modem 20 at customer's location via a telephone communications lines 22. Customer's computer 18 is also coupled to a printer 24 which prints data sheets compiled by the electronic catalog system 10. Illustratively, printer 24 is an HP Laser Jet printer available from Hewlett Packard. A dot matrix printer may also be used.

Vendor's computer 12 includes a 32-bit, 33-MHZ microprocessor 26. Illustratively, microprocessor 26 is an Intel 386 or an Intel 486 model microprocessor available from Intel Corporation. Vendor's computer 12 also includes a 12 megabyte internal RAM. Illustratively, a 420 megabyte hard disk drive 30 is also included. Vendor's computer 12 further includes a VGA graphics monitor 31.

Figure 1B:
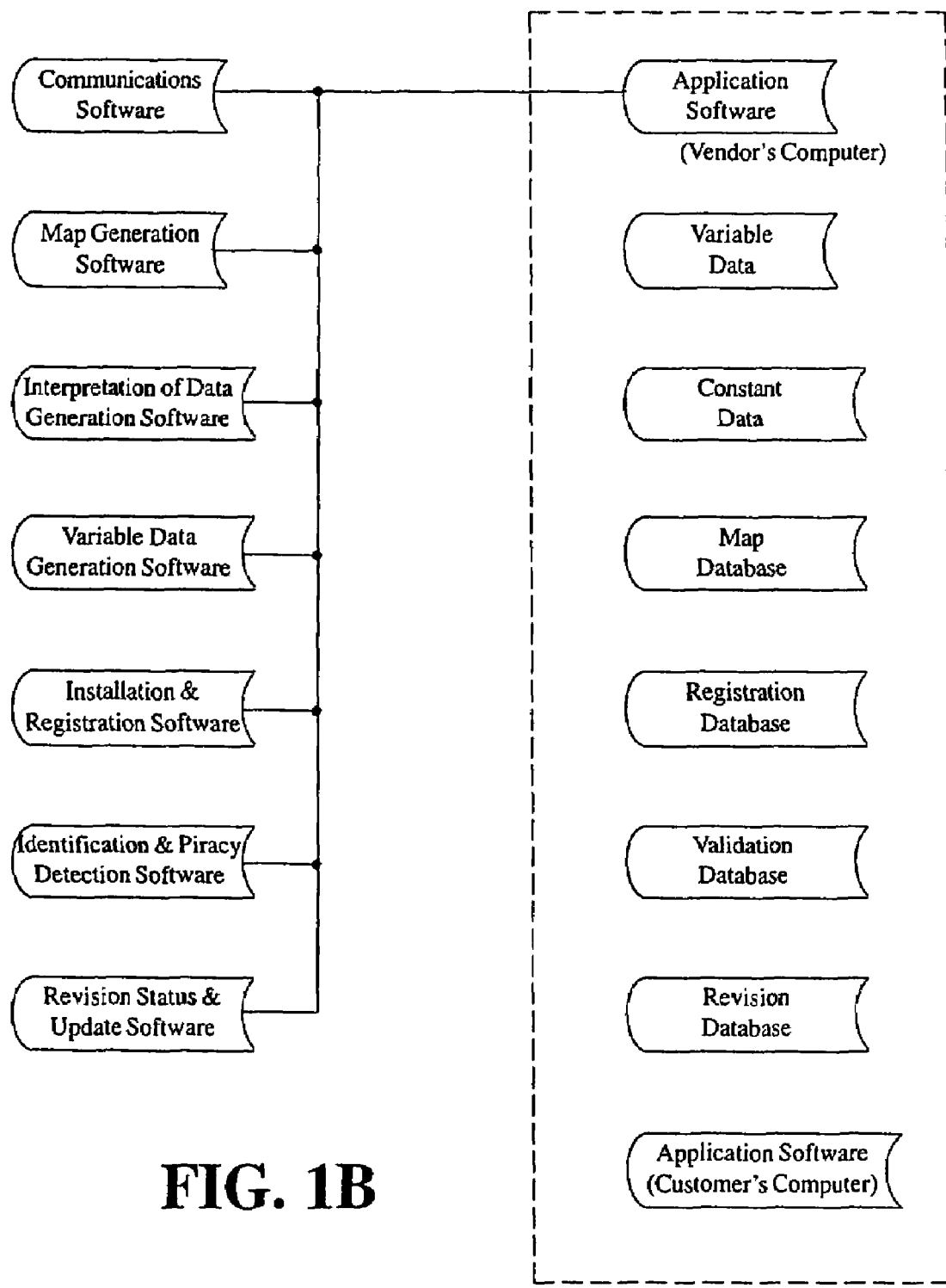
FIG. 1B is a block diagram illustrating the software and data stored in the memory of the vendor's computer.

As illustrated in FIG. 1B, application software is stored on hard disk drive 30 of vendor's computer 12. The application software on vendor's computer 12 includes communications software, map generation software, interpretation of data request software, variable data generation software, installation and registration software, identification and piracy detection software, and revision status and update software. In addition, hard disk drive 30 of vendor's computer 12 is used to store variable data, constant data, a map data base, a registration data base, a validation data base, a revision data base, and application software for the customer's computer 18.

Figure 1C:
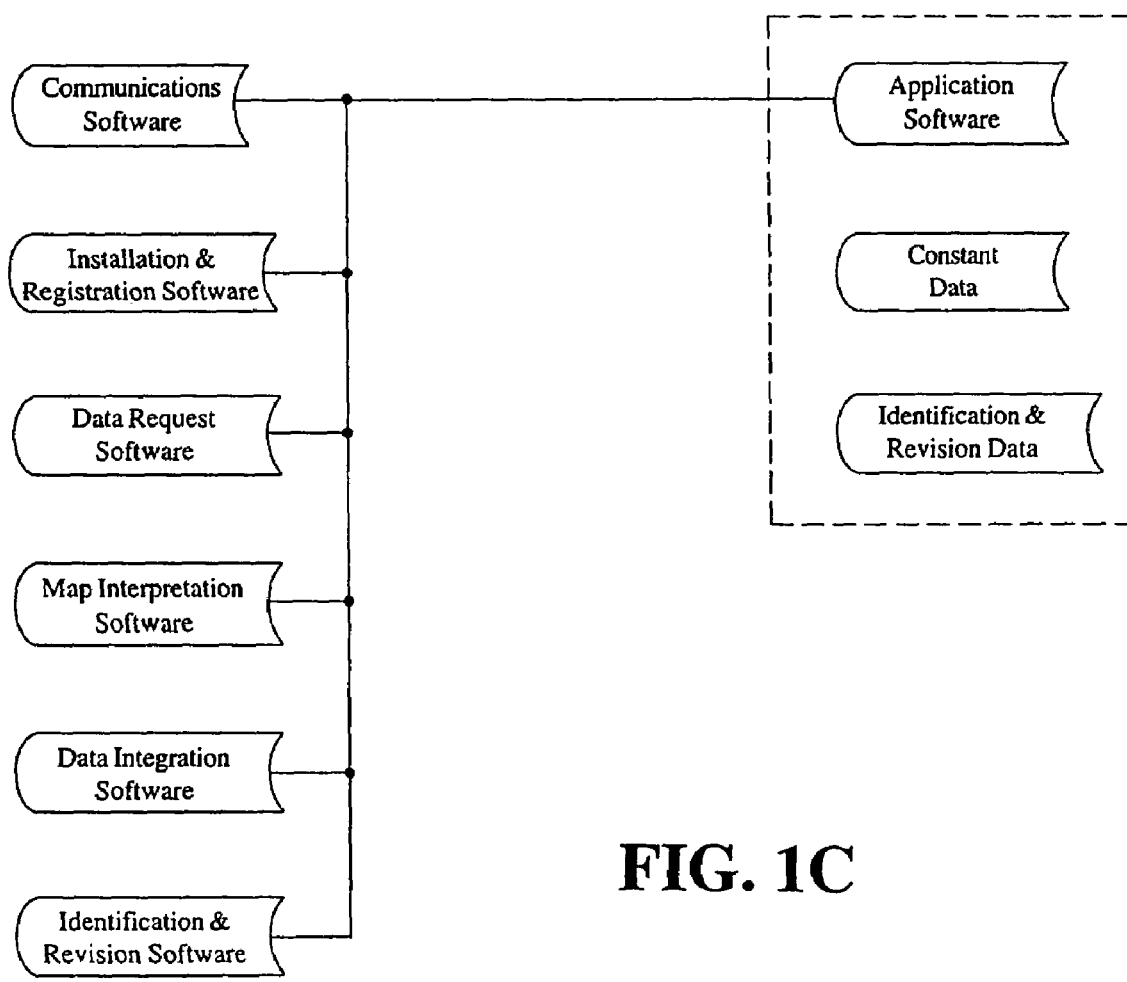
FIG. 1C is a block diagram illustrating the software and data stored in the memory of the customer's computer.

Customer's computer 18 includes a 16-MHZ 386 SX microprocessor 32 available from Intel Corporation. The computer 18 also includes a one megabyte internal RAM 34 and a fixed 60 megabyte hard disk drive 36. Customer's computer 18 further includes an EGA or VGA graphics monitor 38, a floppy disk drive 40, and a serial communications port 42. As illustrated in FIG. 1C, application software is stored on hard disk drive 36 of customer's computer 18. Application software on customer's computer 18 includes communications software, installation and registration software, data request software, map interpretation software, data integration software, and identification and revision software. In addition, constant data and identification and revision data are stored on hard disk drive 36 of customer's computer 18.

The communication software stored on vendor's computer 12 and customer's computer 18 is a copyrighted communications software module available from CAD-DCENTERS in Indianapolis, Ind. The variable data generation software stored on vendor's computer 12 works as follows. Customer's computer 18 generates a SQL statement that is sent to vendor's computer 12. Vendor's computer 12 interprets and uses the SQL statement in a conventional manner to access specified data within the variable data base stored in the memory of vendor's computer 12. SQL is an ANSI standard computer language.

It is understood that any computer with 512 K of RAM, a hard disk with at least two megabytes of free space, either a 5¼" or a 3½" floppy disk drive, a serial port, and a graphics monitor may be used with the present invention as customer's computer 18. If the customer desires to print out catalog data sheets, a printer 24 must be provided.

The distribution of graphics data by phone lines 22 is very slow, especially if high resolution is desired. As a result, it is common practice to provide high quality technical specification sheets by mail or courier. The electronic catalog system 10 of the present invention overcomes the speed disadvantage by creating a graphics catalog data base using both parametric design techniques and distributed data design techniques. When the customer requests information from the vendor that includes graphics data, the variable data is obtained by dialing vendor's computer 12 and downloading the required data. This data is then merged with locally resident graphics data previously stored on customer's computer 18 to generate a complete data sheet which includes both graphics and textual data. Therefore, the present system 10 combines the techniques of a distributed data base system with a parametric design system to minimize the time required for a customer to access vendor's computer 12 on a real time basis. Therefore, the present invention makes it practical for a vendor to offer technical data sheets with high resolution graphics to its customer on a real time basis.

Examples of variable data used for generation of product data sheets include product titles, numbers, dimensional data, specifications. Variable data is stored in Vendor's computer 12. Examples of constant data used for generation of data sheets include logos, graphics data for outlines and boxes, format data which labels the units of the product specifications (i.e. Hertz, Volts, RPM, etc), and graphics data illustrating the configuration of various products. Constant data is stored in customer's computer 18.

The electronic catalog software installation and support files are provided to a customer on 3½", 1.44 megabyte diskettes. The electronic catalog system 10 of the present invention provides automatic serialization and software registration during installation of the software. Vendor's computer 12 controls the automatic serialization and registration of the software located on customer's computer 18. In addition, vendor's computer 12 automatically checks for necessary updates in customer's software and then automatically updates the software in customer's computer 18 if such changes are required.

The purpose of this serialization and registration function is to provide a method of insuring registration of the software and to provide a dynamic means of serializing each installed software package. To accomplish this, special purpose software is provided on a floppy disk to the customer at customer's remote computer 18. This installation software controls the hardware to download a serialized copy of software from vendor's computer 12 to customer's computer 18. In addition, the installation software prepares customer's computer 18 for its intended use of the software.

The installation software included on a floppy disk is placed in an appropriate drive 40 of customer's computer 18 which is illustratively drive A for demonstration purposes. Drive A is selected as the current working drive by typing "a:" and "enter" on customer's computer 18.

Figure 2A:
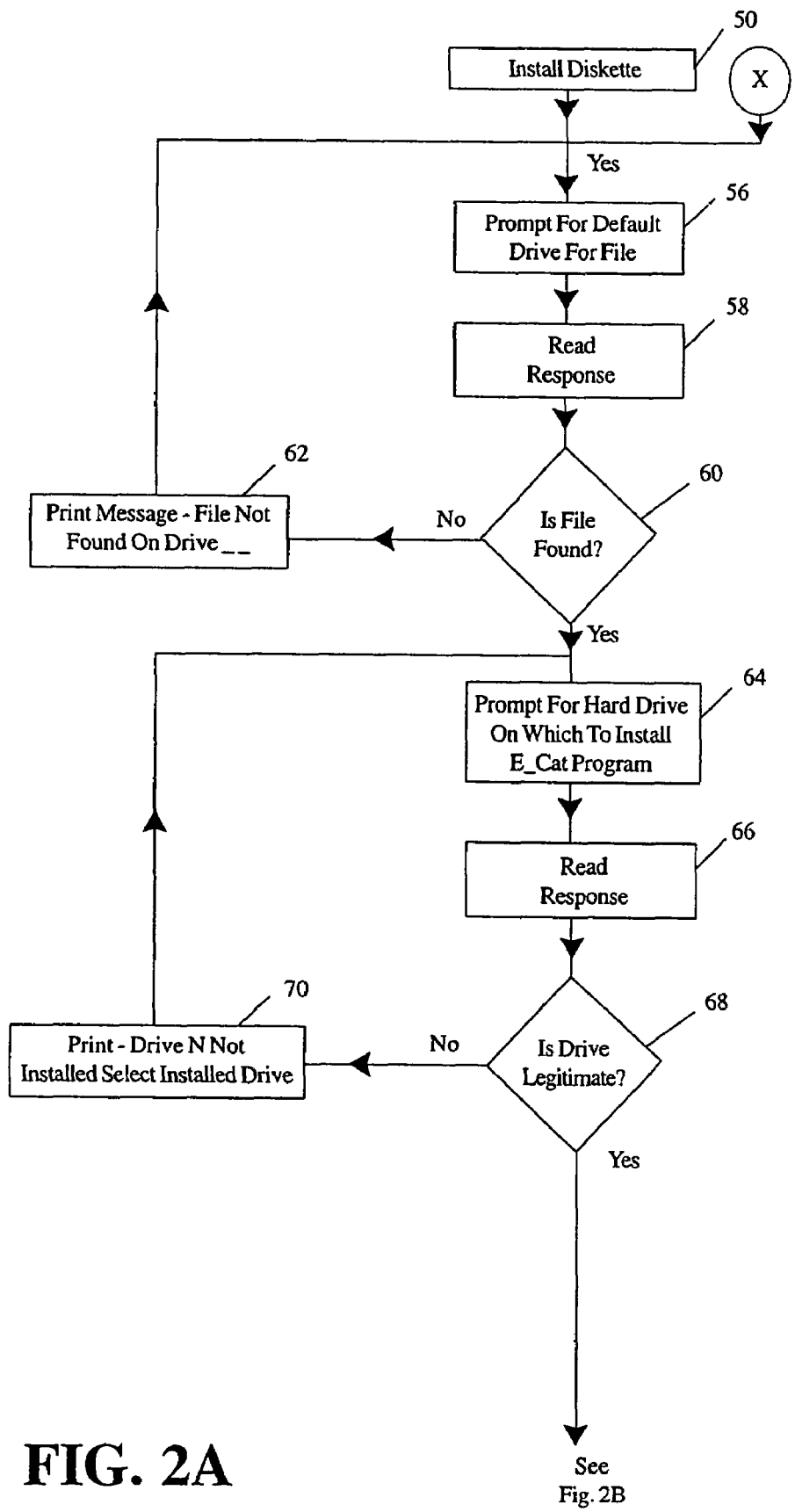
FIGS. 2A and 2B are flow charts illustrating the steps performed by the electronic catalog system of the present invention during a first portion of the procedure for installation and serialization of software onto the customer's computer.
Figure 2B:
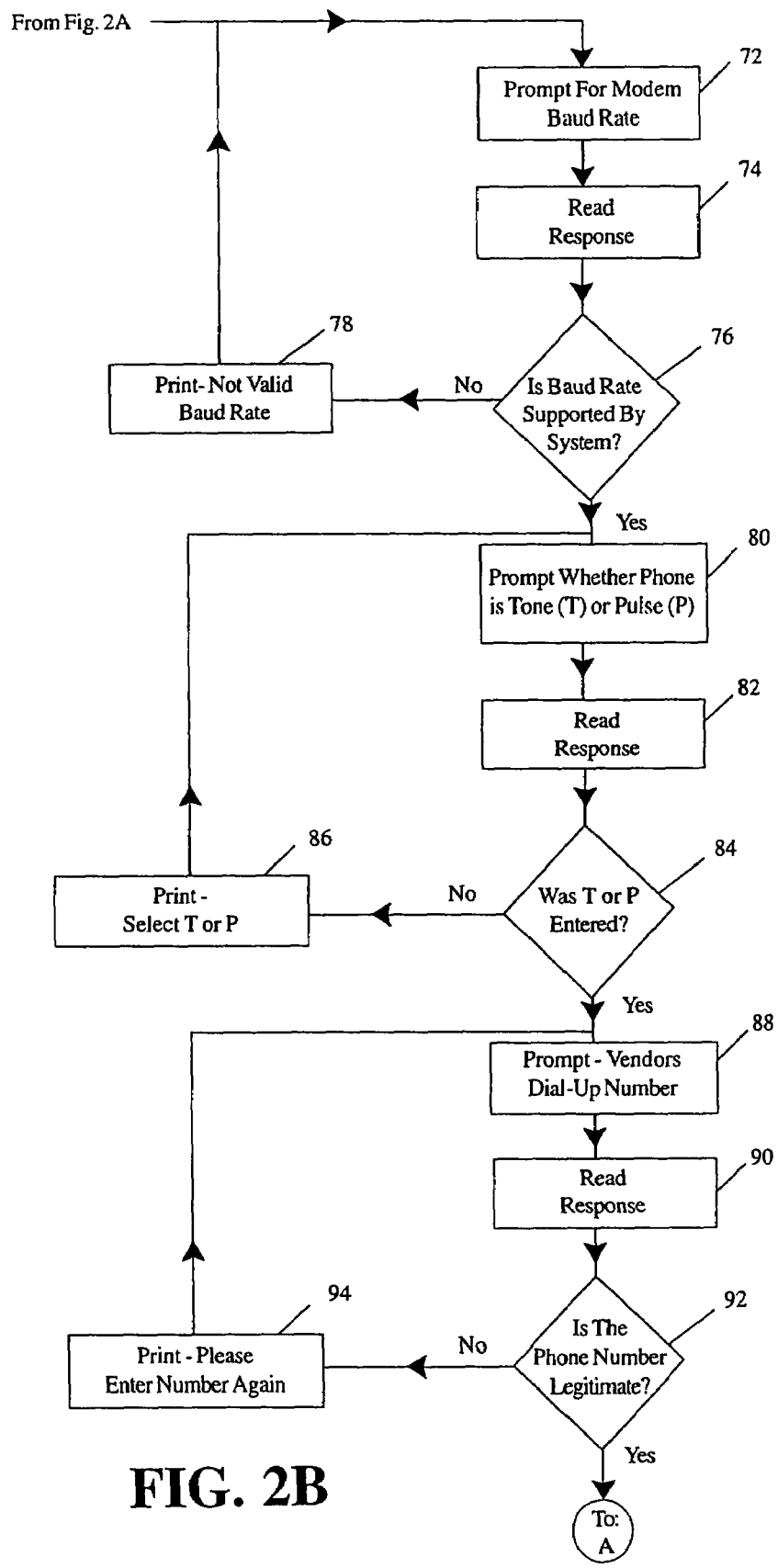

FIGS. 2A and 2B illustrate a flow chart of the steps performed by the electronic catalog system 10 during installation of the software onto customer's computer 18. The diskette is installed as illustrated by block 50. To start the program, the customer types "install" and "enter". Customer's computer 18 generates a screen with multiple questions to install the software and to provide software registration information. A file labelled "autoexec.bat" on customer's computer 18 will be modified by the installation software. Therefore, the user is queried at block 56 for the drive on which the autoexec.bat file can be found. Customer's computer 18 reads the drive response at block 58. Customer's computer 18 confirms that the file is on the drive entered at block 60. If the file is not found, a message is printed at block 62 and the user is prompted to reenter the drive. Customer's computer 18 continues to loop until the correct drive is input.

Once the autoexec.bat file is verified, the user is queried for the hard drive on which he wishes to install the electronic catalog program (ECAT) as illustrated at block 64. Customer's computer 18 reads the entered drive at block 66. The drive given must be a legitimate drive on customer's computer 18. This is checked at block 68. If the drive is not legitimate, customer's computer 18 generates an error message and loops back at block 70 until a legitimate drive is input.

The customer is then queried for the baud rate of his modem at block 72. Customer's computer 18 reads the entered baud rate at block 74. Customer's computer 18 determines whether the entered modem baud rate is supported by the system at block 76. If the baud rate is not supported, an error message is printed at block 78 and the customer is again queried for the baud rate at block 72. There will always be a finite number of baud rates. Currently, the available modem baud rates are either 1200 baud and 2400 baud. The software will continue to loop until one of these two baud rates is entered.

Once a proper baud rate for modem 20 is entered, the customer is queried for his phone type, either tone or pulse, at block 80. These are the standard phone types today. Other types may be added in the future. Again, the user must respond with a currently acceptable phone type. Customer's computer 18 reads the response at block 82 and verifies that either a "T" or a "P" was entered at block 84. If a "T" or "P" was not entered, customer's computer 18 prints an error message at block 86 and the customer is again queried for the phone type at block 80.

The customer is then queried for the telephone number of his vendor's computer 12 at block 88. Customer's computer 18 reads the response at block 90, and the answer is checked against known acceptable telephone number formats. If the format is not correct, customer's computer 18 prints an error message at block 94 and the customer is again queried for telephone number at block 88.

Figure 3:
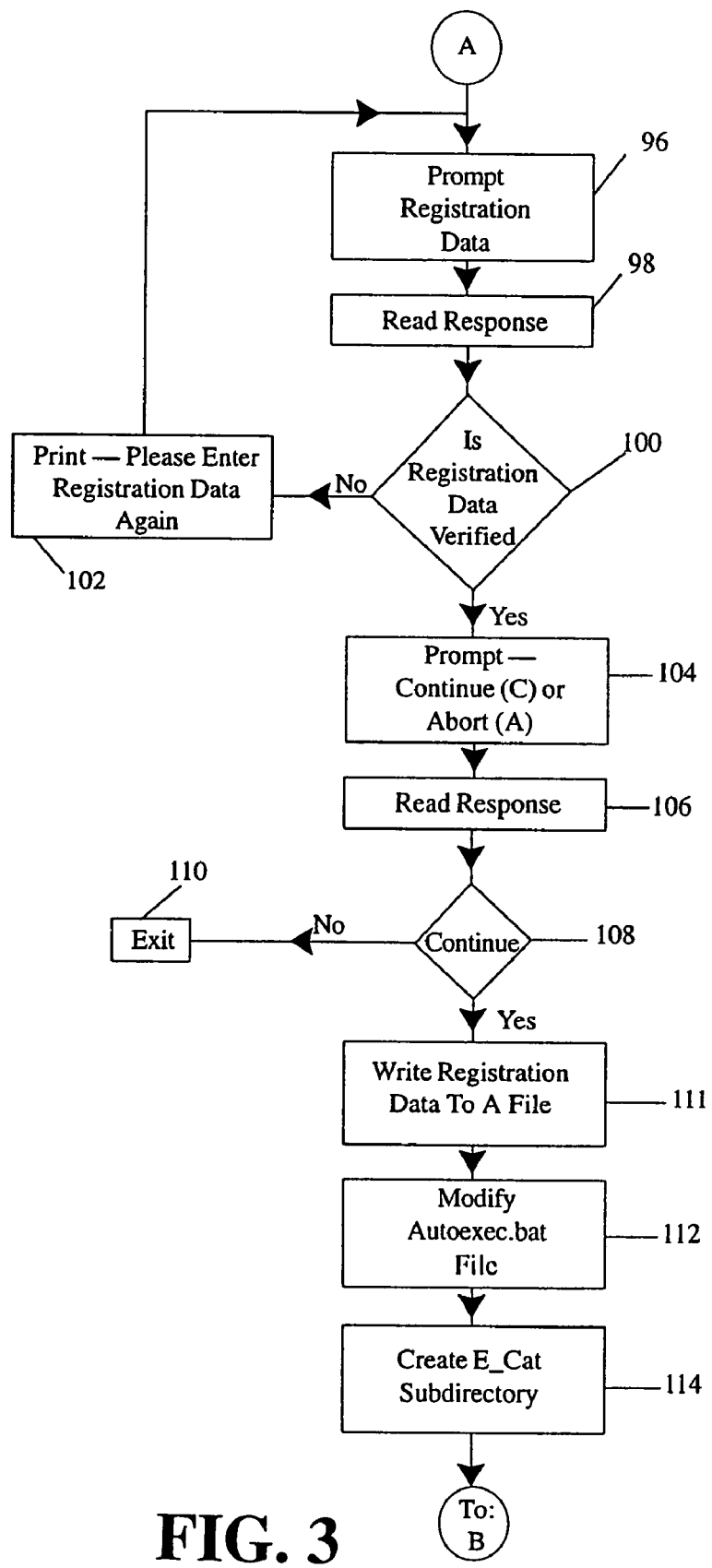
FIG. 3 is a flow chart illustrating the steps performed by the electronic catalog system during registration of the software on the customer's computer.

The customer is next queried at block 96 in FIG. 3 for a list of registration data that is required for registration of the software that is to be downloaded from vendor's computer 12. This registration data includes the customer's name, the customer's company name, Division, Company Address, Company City, Company State, Province, Country, Zip/Postal Code, and Company Voice Telephone Number. Additional registration data may also be included, if desired. Customer's computer 18 reads the registration data input at block 98. The registration data is then verified at block 100. Specifically, customer's computer 18 verifies that at least two characters have been entered and that only numbers are entered for the telephone number. If the registration data is not verified, customer's computer 18 prints a message for the customer to reenter the registration data at block 102, and the customer is again queried for registration data at block 96.

If the registration data is verified, customer's computer 18 has sufficient information to permit the modification of customer's computer 18 configuration and to request a serialized copy of the electronic catalog software from vendor's computer 12. Before proceeding, the customer is prompted at block 104 to determine whether the customer wishes to continue or abort the installation. Customer's computer 18 reads the response at block 106. Customer's computer 18 determines whether the continue or the abort selection was made block 108. If the customer selected to abort the installation, customer's computer 18 exits to the operating system at block 110. If the customer selected to continue the installation, customer's computer 18 writes the registration and identification data to a file at block 111. The autoexec.bat file is modified at block 112, and a subdirectory for the ECAT program is created at block 114 pursuant to a previous user response.

Figure 4:
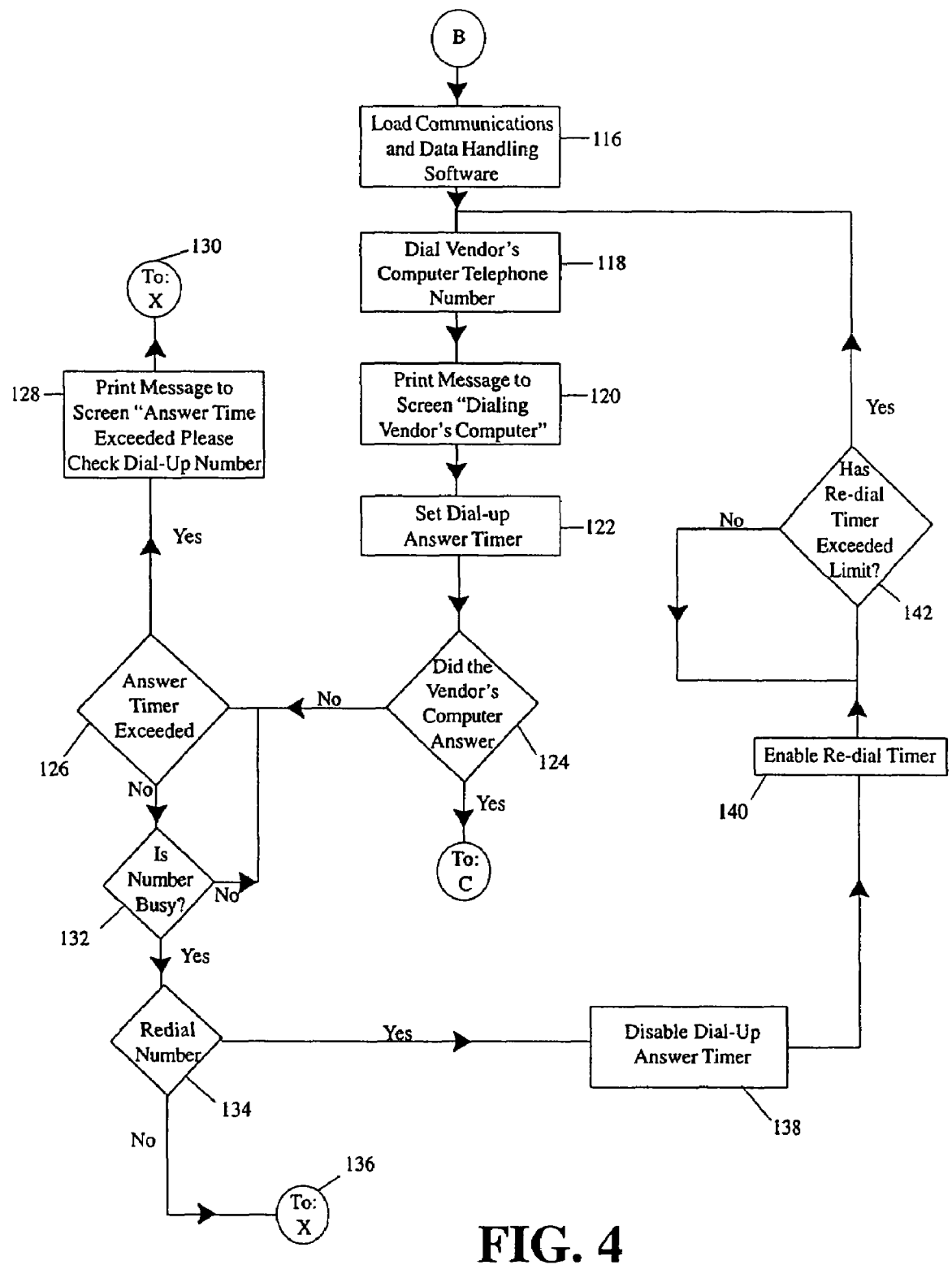
FIG. 4 is a flow chart illustrating the steps performed by the electronic catalog system when the customer's computer dials up the vendor's computer to establish a communication link.

As illustrated in FIG. 4, the communications and data handling software functions are then loaded onto customer's computer 18 at block 116. Customer's computer 18 then automatically dials the telephone number of vendor's computer 12 as illustrated at block 118. The telephone number of vendor's computer 12 is found in the registration and identification data file previously stored on customer's computer 18 at block 111 in FIG. 3. It is understood that communications between vendor's computer 12 and customer's computer 18 could also be implemented on a wide area network (WAN) in which several different communication tools could be used. These communication tools include, for example, multiple local area networks, satellite communications, land lines, and optic lines.

The customer is advised that customer's computer 18 is dialing vendor's computer 12 at block 120. Customer's computer 18 sets an answer timer at block 122. Customer's computer 18 determines whether vendor's computer 12 has answered the telephone call at block 124. If vendor's computer 12 has not answered, customer's computer 18 determines whether the answer time limit has been exceeded at block 126. If the answer time limit has been exceeded, customer's computer 18 prints a message indicating that the time has been exceeded and advising the customer to check the dial up number at block 128. The system then exits back to block 56 in FIG. 2A (registration screen) at block 130.

If the answer timer has not been exceeded, customer's computer 18 determines whether the vendor's telephone line is busy at block 132. If vendor's telephone line is not busy, customer's computer 18 continues to wait until vendor's computer 12 answers or until the answer timer limit has been exceeded. If vendor's telephone line is busy, customer's computer 18 queries the customer whether to redial the number at block 134. If the customer does not wish to redial the number, customer's computer 18 exits to the operating system at block 136. If the customer wishes to redial the number, customer's computer 18 disables the dial-up answer timer at block 138 and enables the redial timer at block 140. The redial timer sets a predetermined delay period for redialing vendor's computer number. After the redial timer has exceeded a preset limit at block 142, customer's computer 18 dials vendor's computer number again at block 118.

Figure 5:
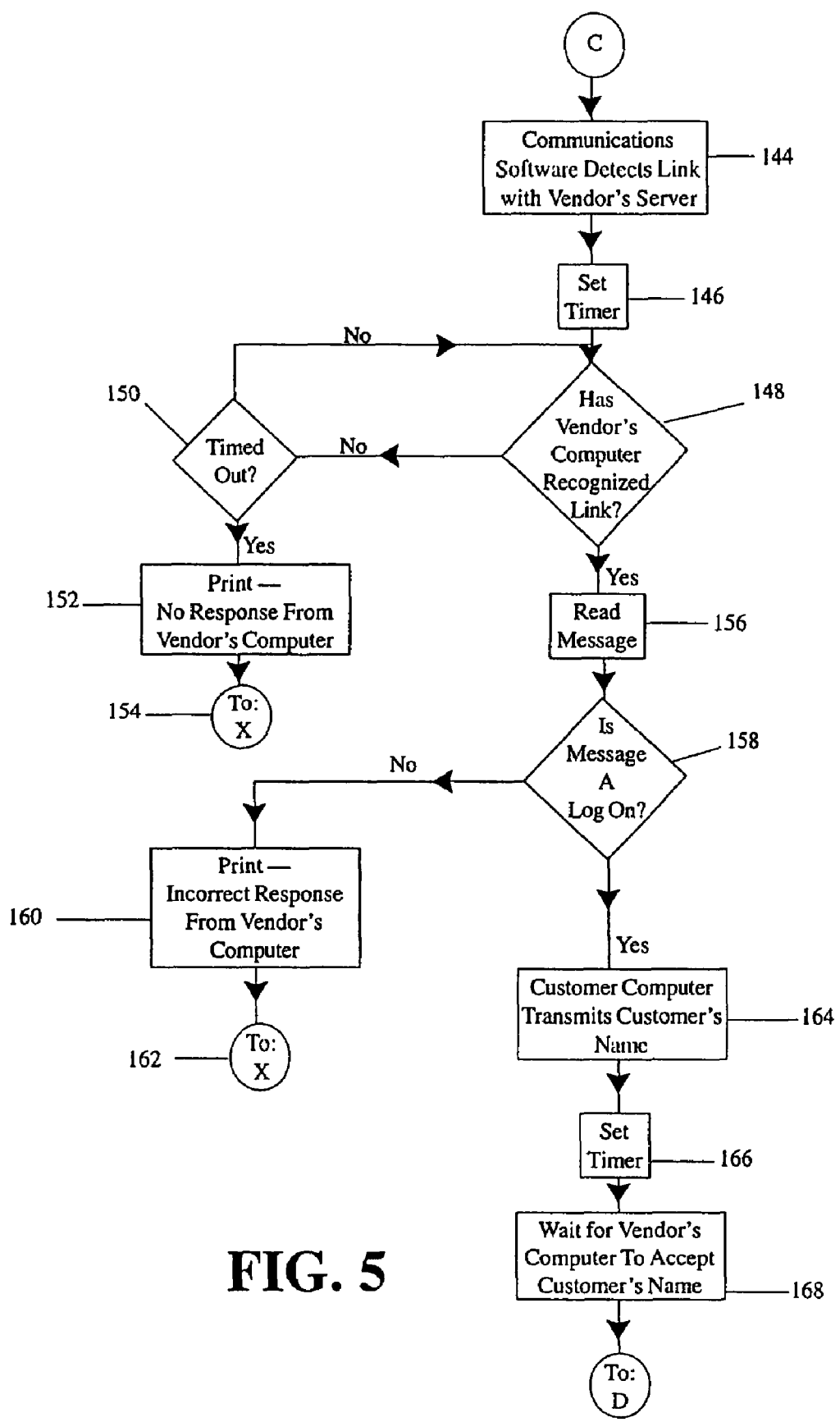
FIG. 5 is a flow chart illustrating further steps performed by the electronic catalog system during initial communications between the customer's computer and vendor's computer.

If vendor's computer 12 answers the call from customer's computer 18, customer's computer 18 detects the link with vendor's computer 12 at block 144 in FIG. 5. A timer is set at block 146. Customer's computer 18 then waits for an acknowledgement from vendor's computer 12 that vendor's computer 12 has recognized the computer link at block 148. If vendor's computer 12 has not recognized the link, customer's computer 18 determines whether the time limit set by the timer 146 has been exceeded at block 150. If the time limit has not been exceeded, customer's computer 18 waits for the indication that vendor's computer 12 has recognized the computer link by returning to block 148. If the time limit set by timer 146 has been exceeded, customer's computer 18 prints a message that there was no response from vendor's computer 12 at block 152. Customer's computer 18 then hangs up and exits back to block 56 in FIG. 2A (registration screen) at block 154.

If vendor's computer 12 sends an acknowledgment that vendor's computer 12 has recognized the computer link, customer's computer 18 reads the message at block 156. Customer's computer 18 then determines whether the message at 156 was a log on at decision block 158. If the message at block 156 was not a log on, customer's computer 18 prints a message that an incorrect response has been received from vendor's computer 12 at block 160. Customer's computer 18 then hangs up and exits back to block 56 in FIG. 2A (registration screen) at block 162.

If the acknowledgment message from vendor's computer 12 is a log on, customer's computer 18 automatically transmits the customer name to vendor's computer 12 at block 164. A timer is set at block 166. Customer's computer 18 waits for vendor's computer 12 to accept customer's name at block 168.

Figure 6A:
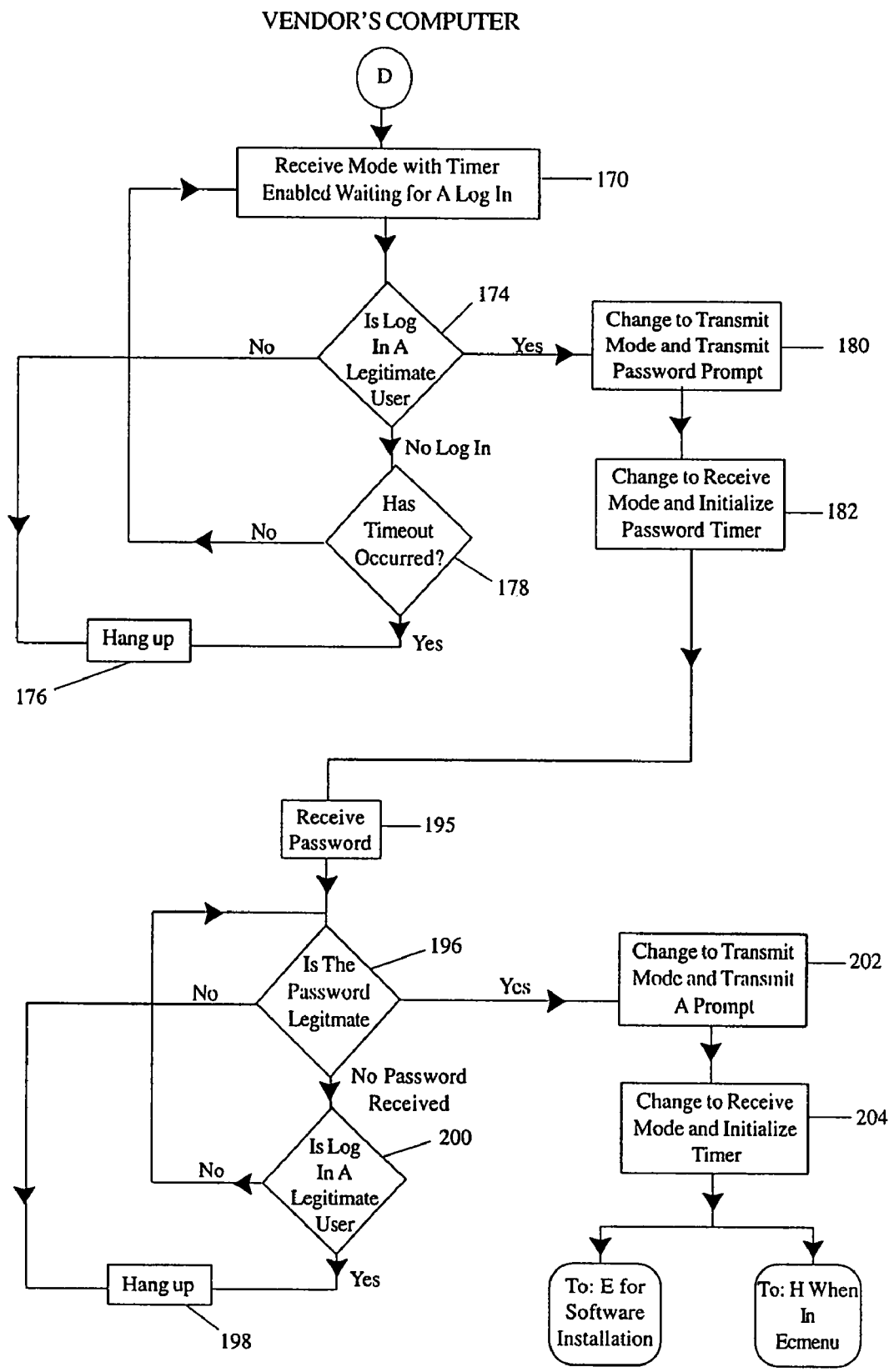
FIGS. 6A and 6B are flow charts illustrating steps performed by vendor's computer and steps performed by the customer's computer during an initial identification period.
Figure 6B:
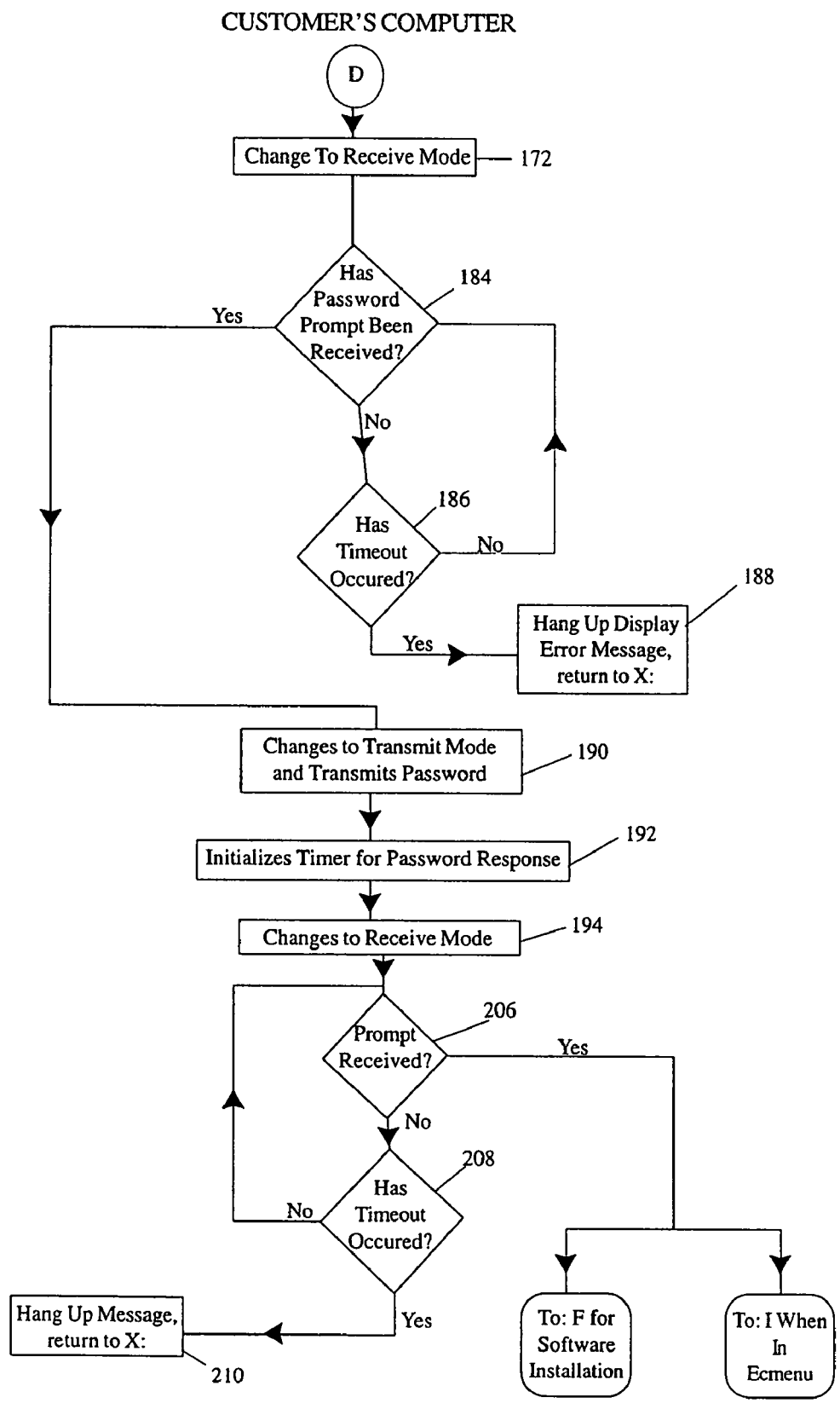
Figure 7A:
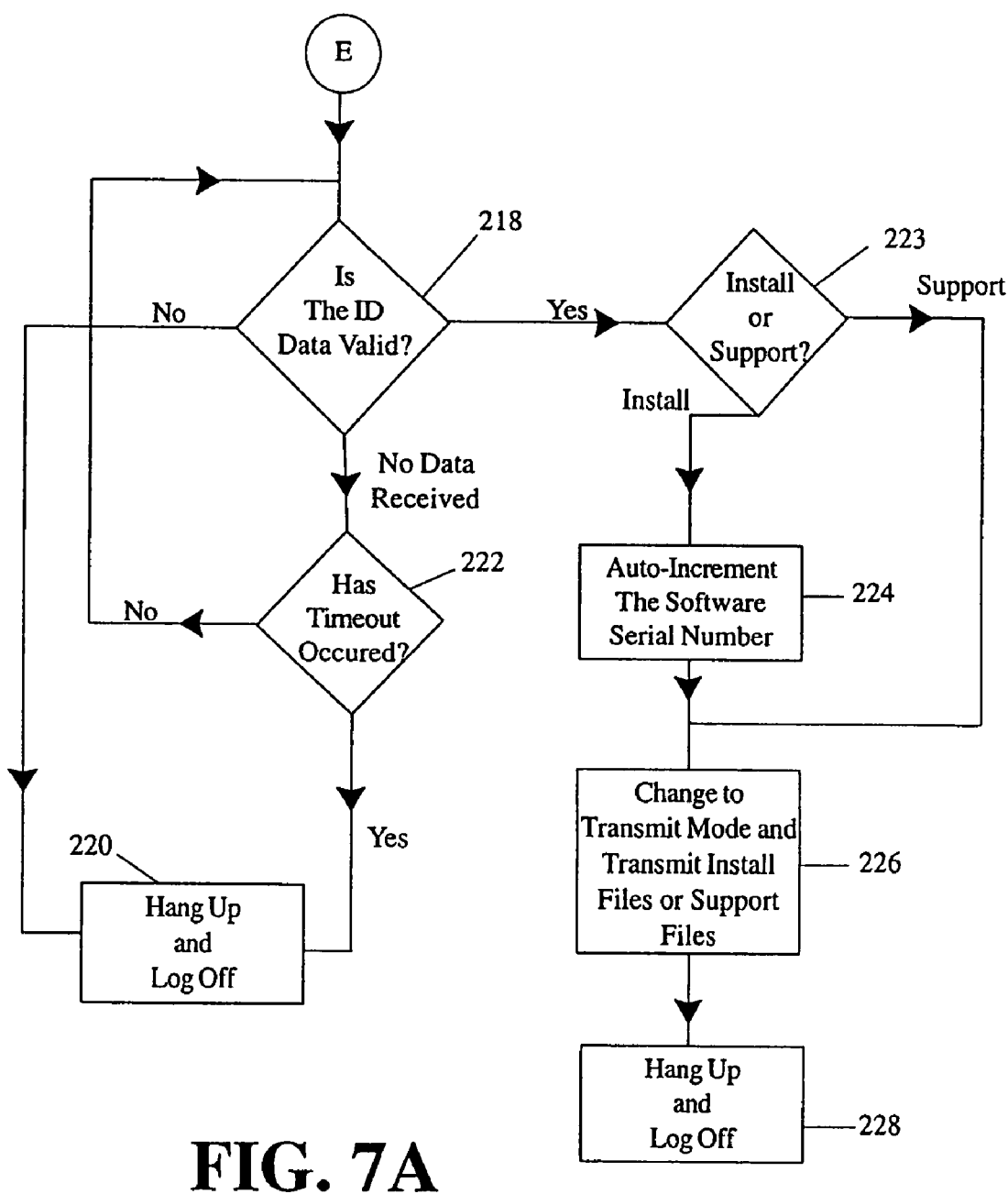
FIGS. 7A, 7B, and 7C are flow charts illustrating the steps performed by the electronic catalog system to serialize the software according to registration data and to install the software onto the customer's computer automatically.
Figure 7B:
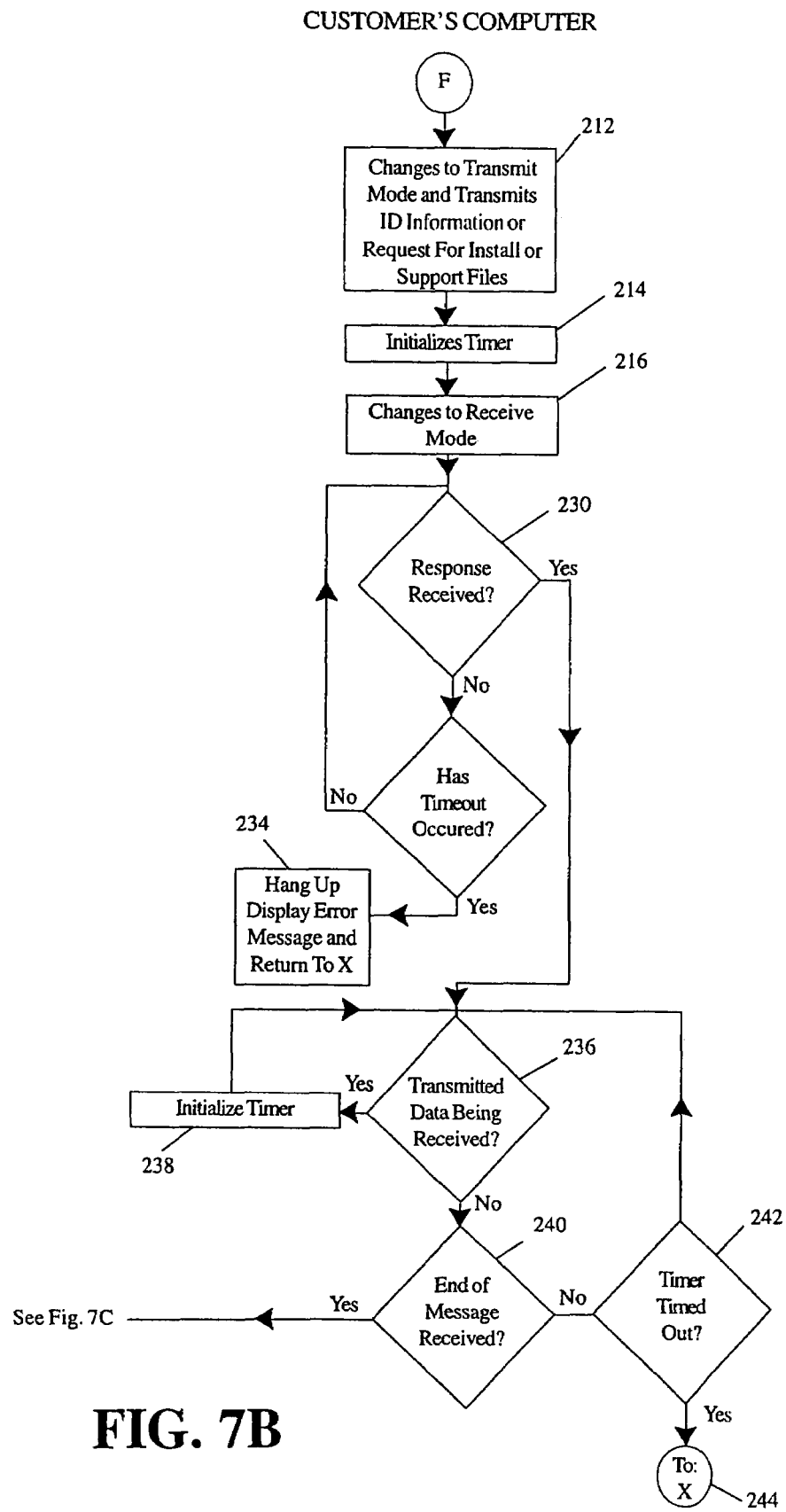
Figure 7C:
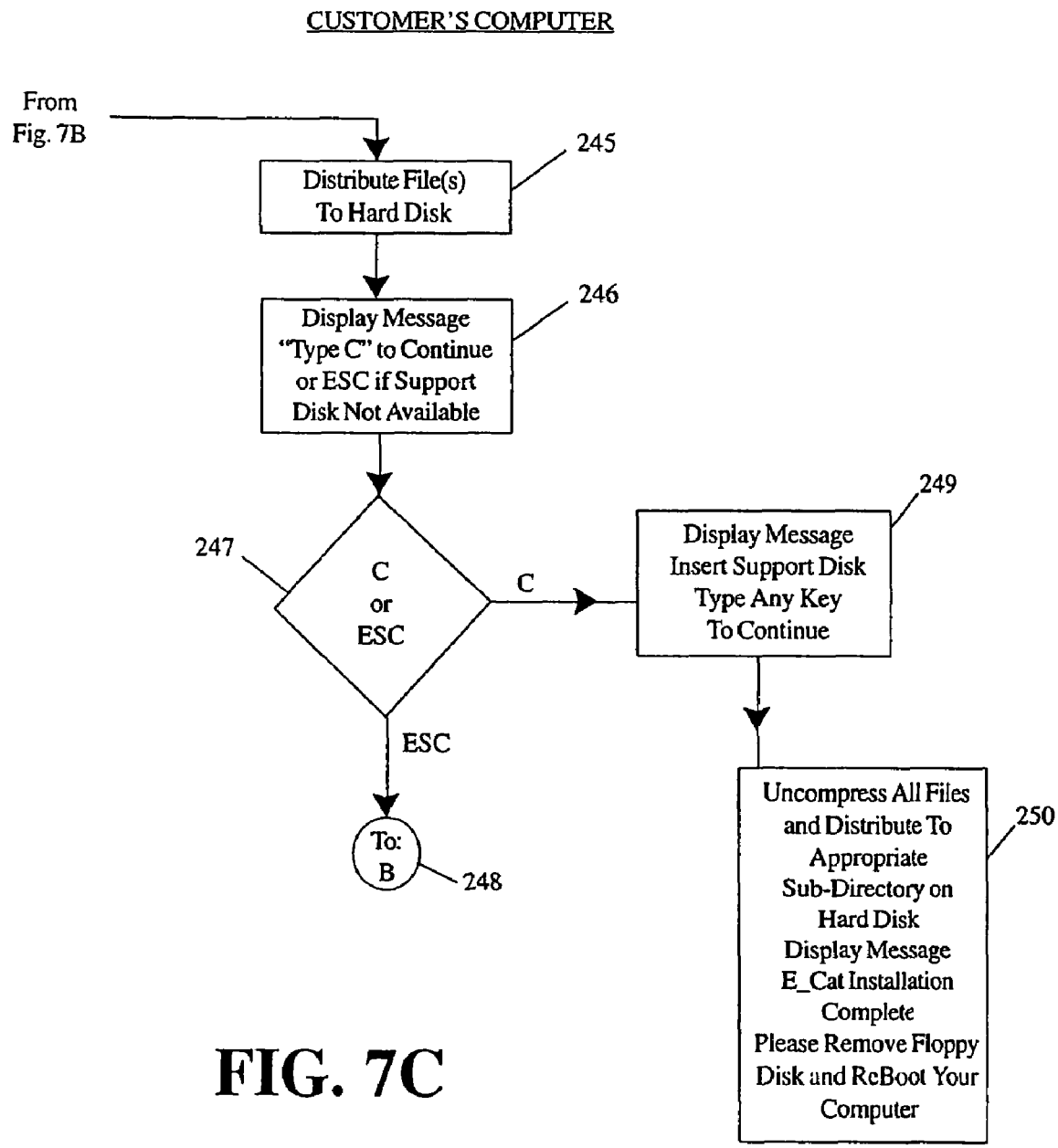
Figure 8:
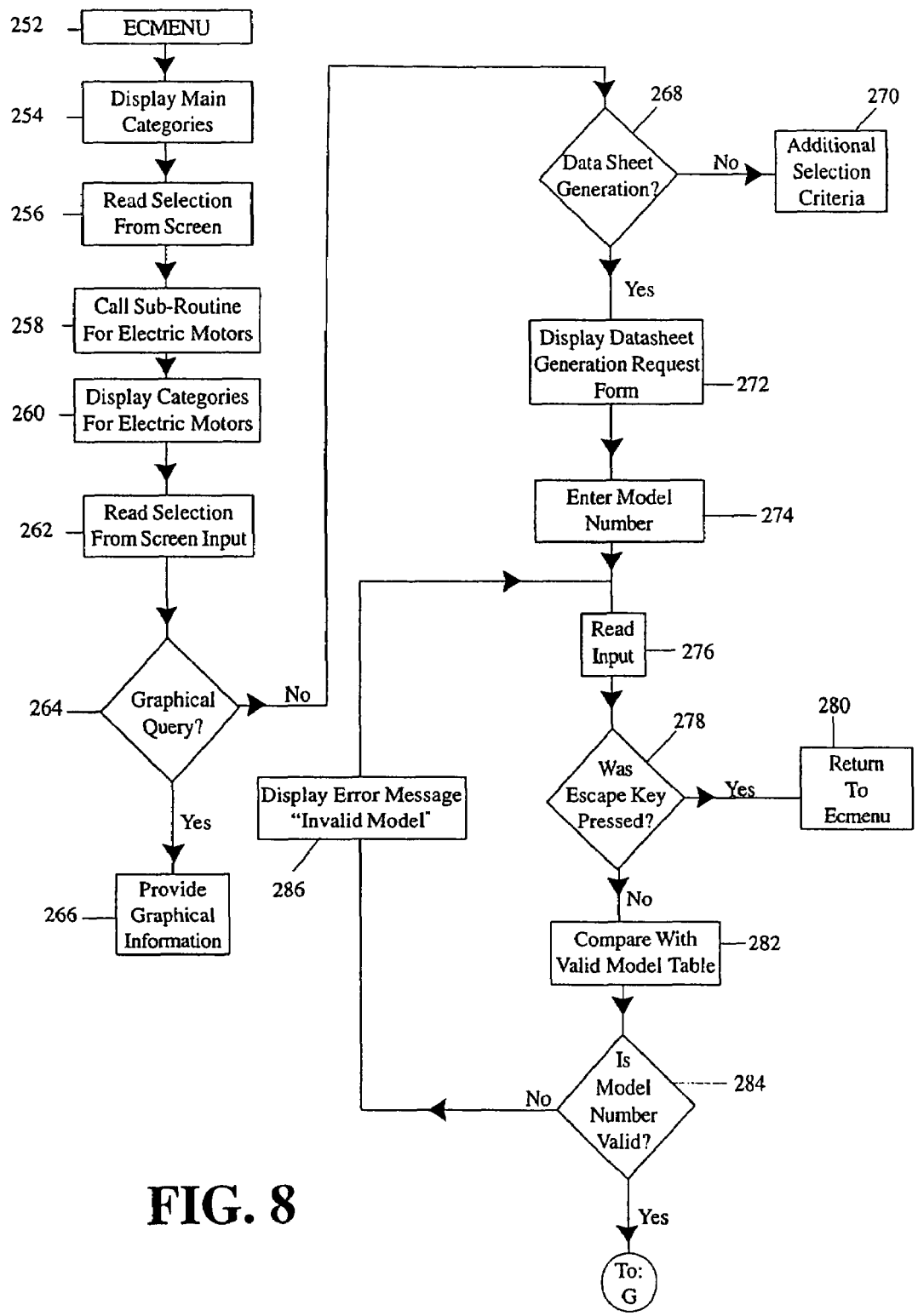
FIG. 8 is a flow chart illustrating the steps performed by the electronic catalog system as the customer browses through the electronic catalog menu resident on the customer's computer to request catalog information.
Figure 9:
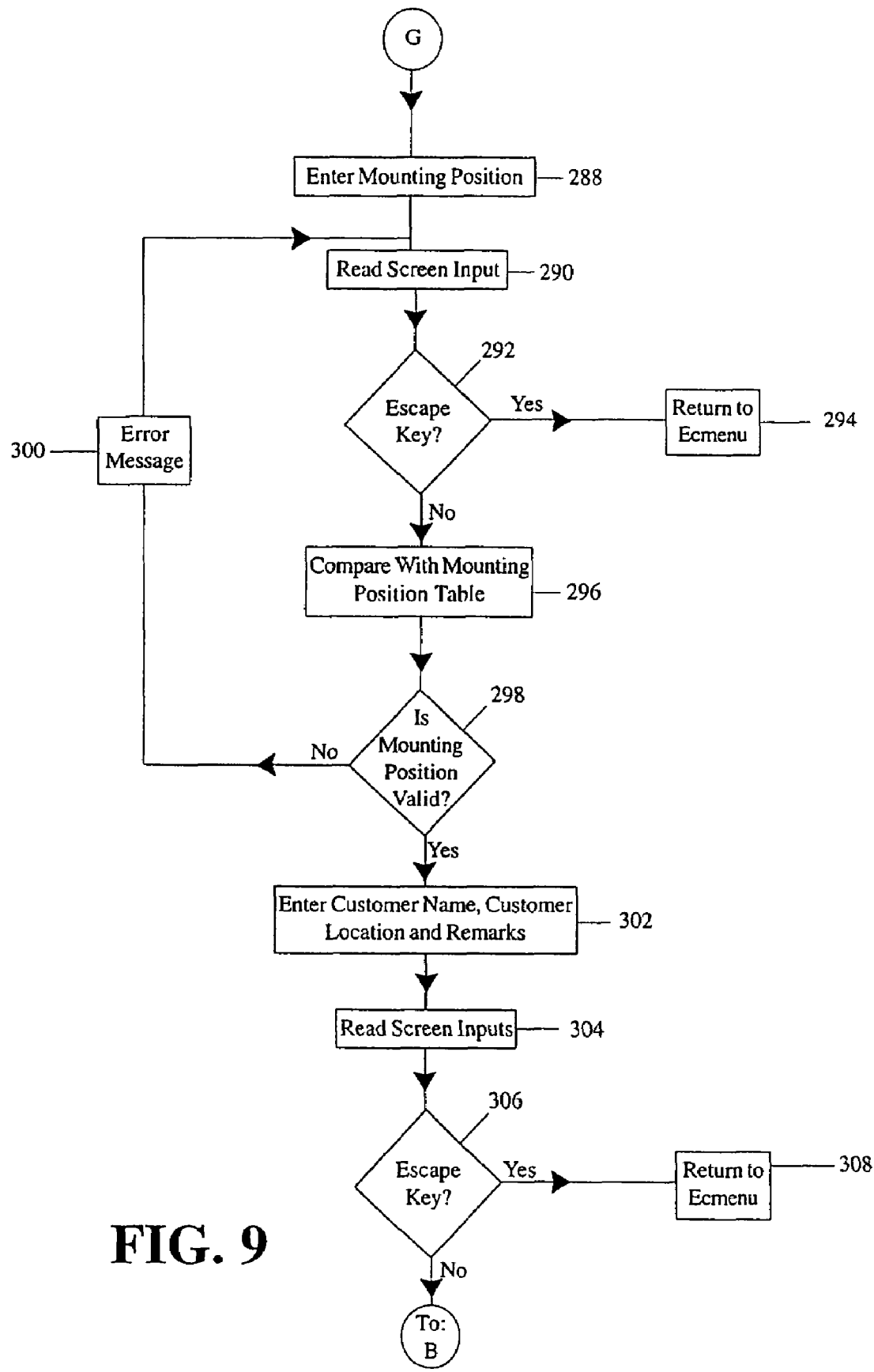
FIG. 9 is a flow chart illustrating further steps performed by the electronic catalog system to prompt additional data from the customer related to the desired products.

In FIGS. 6 and 7, the steps performed by vendor's computer 12 are illustrated in FIGS. 6A and 7A and the steps performed by customer's computer 18 are illustrated in FIGS. 6B, 7B, and 7C. Vendor's computer 12 transmits a log on prompt at block 170 in FIG. 6A. After transmitting customer's log on at block 164, customer's computer 18 changes to a receive mode at block 172. Vendor's computer 12 determines whether the log on is legitimate at block 174. If the log on is not legitimate, vendor's computer 12 will automatically hang up at block 176. If no log on has been received, vendor's computer 12 determines whether a time-out has occurred at block 178. If a time-out has not occurred, vendor's computer 12 waits to receive the log on information by returning to block 174. If the time-out has occurred, vendor's computer 12 hangs up at block 176.

If the log on received from customer's computer 18 is legitimate, vendor's computer 12 changes to the transmit mode and transmits a password prompt to customer's computer 18. Vendor's computer 12 then changes to the receive mode and initializes a password timer at block 182. Customer's computer 18 monitors whether the password prompt has been received at block 184. If the password prompt has not been received customer's computer 18 determines whether a time-out has occurred at block 186. If the time-out has not occurred, customer's computer 18 continues to wait for the password prompt by returning to block 184. If a time-out has occurred, customer's computer 18 will hang up and display an error message and returns to block 56 in FIG. 2A (registration screen) at block 188.

Once the password prompt has been received, customer's computer 18 changes to transmit mode and transmits the password to vendor's computer 12 at block 190. Customer's computer 18 then initializes a timer at block 191 and changes to a receive mode at block 194 to wait for further input from vendor's computer 12. Vendor's computer 12 receives the password from customer's computer 18 at block 195 and determines whether the password is legitimate at block 196. If the password is not legitimate, vendor's computer 12 hangs up at block 198. If no password has been received, vendor's computer 12 determines whether a time-out has occurred at block 200. If a time-out has not occurred, vendor's computer 12 waits an additional time period to receive the password from customer's computer 18 by returning to block 196. If a time-out has occurred, vendor's computer hangs up at block 198.

If the password received from customer's computer 18 is legitimate, vendor's computer 12 changes to the transmit mode and transmits a prompt to customer's computer 18 as illustrated at block 202. Vendor's computer 12 then changes to a receive mode and initiates a timer at block 204. Customer's computer 18 detects whether a prompt has been received at block 206. If no prompt has been received, customer's computer 18 determines whether or not a time-out has occurred at block 208. If a time-out has not occurred, customer's computer 18 continues to wait for a prompt to be received by returning to block 206. If a time-out has occurred, customer's computer 18 hangs up, generates an error message, and returns to block 56 in FIG. 2A (registration screen) at block 210.

If a prompt has been received, customer's computer 18 changes to transmit mode and transmits coded identification and a request for installation or support as illustrated at block 212 in FIG. 7B. Customer's computer 18 initializes a timer at block 214 and changes to a receive mode at block 216. Vendor's computer 12 checks the identification file received from customer's computer 18 to determine whether the identification file is valid as illustrated at block 218. Vendor's computer 12 compares the identification file received from customer's computer 18 with a validation data file stored on hard drive 30 of vendor's computer 12. The validation data file includes each serial number generated by vendor's computer 12 for each customer of the vendor. In other words, each customer that downloads software from vendor's computer 12 has an individual serial number which identifies that particular customer. Therefore, vendor's computer 12 can track the software of each customer separately to determine if the software has been pirated as discussed below. The validation data file also stores the revision level of the software and constant data corresponding to each serial number and an indication of the validation status of each particular serial number. The validation status indicates whether the software stored in the customer's computer 18 is valid or invalid. A "YES" validation status indicates that the software is valid. A "NO" validation status indicates that the software has been pirated. An example of the validation data file and the step of validating the software on customer's computer 18 is illustrated below.

In the validation process, the identification data sent by customer's computer 18 must contain both a serial number and a revision level that matches the validation data file stored in the validation data file on vendor's computer 12.

As an example, if the complete program for serial number 0001 0101 0001 with a revision level of 2 had been pirated, the first copy of the software to access vendor's computer for data would be automatically updated to revision level 3, assuming that the main program revision status was at revision level 3. The validation data file would then read as follows:

| VALIDATION DATA FILE | | |
| --- | --- | --- |
| Serial Number | Revision Level | Validation |
| 0001 0101 0001 | 3 | Y |
| 0001 0101 0002 | 2 | Y |

The next copy of the software to access vendor's computer 12 (a different copy than the first copy), whether it is the original installed copy or the pirated copy, would submit identification data to vendor's computer with the correct serial number, i.e. 0001 0101 0001, but the incorrect revision level 2. Vendor's computer 12 detects the different revision level and sends a message "Invalid Registration, Please Re-install Your Software" to customer's computer 18. Vendor's computer 12 then revises the validation data file to place a "NO" in the validation status column of the validation data file. All future attempts to access data by the serial number 0001 0101 0001 will be refused. The revised validation data file would read as follows:

| REVISED VALIDATION FILE | | |
| --- | --- | --- |
| Serial Number | Revision Level | Validation |
| 0001 0101 0001 | 3 | N |
| 0001 0101 0002 | 2 | Y |

If the identification data file is not valid, vendor's computer 12 hangs up and logs off at block 220. If no identification and registration data file has been received, vendor's computer 12 determines whether a time-out has occurred at block 222. If a time-out has not occurred, vendor's computer 12 waits an additional period of time to receive the identification and registration data from customer's computer 18 by returning to block 218. If a time-out has occurred, vendor's computer 12 hangs up and logs off at block 220.

If the identification data received from customer's computer 18 is valid, vendor's computer 12 determines at block 223 whether the request sent from customer's computer 18 at block 212 was to install files or for support files. If the request was to install files, an identification serial number based on the registration data is automatically generated at block 224 and the necessary software is transmitted to customer's computer 18 at block 226. If the request was for support files, support files are transmitted to customer's computer 18 at block 226. The registration data and serial number is appended to the registration file at vendor's computer 12. The serial number, program revision level, and validation code is appended to the validation file at Vendor's computer 12. Vendor's computer 12 also sends a log on name and password for later use by customer's computer 18 to access product data. Vendor's computer 12 then hangs up and logs off at block 228.

Customer's computer 18 waits to receive a response from vendor's computer 12 at location 230. If a response has not been received, customer's computer 18 determines whether a time-out has occurred at block 232. If a time-out has occurred, customer's computer 18 hangs up and exits to the operating system at block 234. If a time-out has not occurred, customer's computer 18 waits for an additional period of time to receive the information from vendor's computer 12 by returning to block 230. Customer's computer 18 detects whether transmitted data is being received at block 236. If data is being received, customer's computer 18 initializes a timer at block 238. If transmitted data is not being received, customer's computer 18 determines whether an end of message indicator has been received at block 240. If the end of the message has not been received, customer's computer 18 determines whether a time-out has occurred at block 242. If a time-out has occurred, customer's computer 18 displays an error message and exits to the operating system at block 244. If a time-out has not occurred, customer's computer 18 waits an additional period of time for the end of message indicator by returning to block 236.

After an end of message indicator has been received at block 240, customer's computer 18 uncompresses all the files. A message is displayed on customer's computer 18 reading, "Copying DOS Program Files—x file(s) copied". Files received from vendor's computer 12 is distributed to hard disk 36 of customer's computer 12 at block 245.

Customer's computer 18 prompts the customer to type "c" to Continue or "ESC" if the support disk is not available at block 246. Customer's computer 18 determines whether "c" or "ESC" was selected at block 247. If "ESC" was selected, customer's computer 18 returns to location B in FIG. 4 and will redial the vendor's computer 12 and the necessary support files will be downloaded as illustrated at block 248. The support file download is the same as the install download except for the actual files being downloaded.

If "c" was selected, a message "Insert Support Disk #1, Type Any Key to Continue" will be displayed at customer's computer 18 as illustrated at block 249. After inserting the support disk and typing any key, the support files will be copied from the floppy disk and distributed to the proper hard drive and subdirectory.

Assuming that no communication errors are detected during transmission of the serialized software, customer's computer 18 receives the appropriate files to implement the electronic catalog system. A sub-directory specified by vendor's computer 12 is created. The initial menu entitled "ECAT" is modified to include the newly downloaded vendor's data. The downloaded files from vendor's computer 12 are distributed to the proper subdirectories of hard disk 36 as illustrated at block 250. Additional support files which may be needed for particular applications may also be downloaded to customer's computer 18. The customer has the option of downloading these files from vendor's computer 12 or of installing these files from support disks. After all support files have been loaded onto the customer's hard disk 36, a message is displayed at block 250 "ECAT Installation Complete, Please Remove the Floppy Disk and Reboot Your Computer".

Once the electronic catalog (ECAT) program is loaded onto customer's computer 18, the customer is ready to access the catalog information from vendor's computer 12 at any time. The electronic catalog system 10 is initiated by typing "EC MENU" and "ENTER". This brings up the main menu for the electronic catalog system (EC Menu) onto customer's computer 18 as illustrated at block 252 in FIG. 8. Electronic catalog system menu first displays main categories from which the customer may choose to obtain information is illustrated at block 254. These main categories at block 254 include a list of several catalog products from which the customer can choose. A customer enters a selected product and customer's computer 18 reads the selection at block 256. For illustrative purposes, we will assume that the customer has selected to obtain information related to electric motors. It is understood, however, that various other products could be entered or selected depending upon the specific product information stored on customer's computer 18 and vendor's computer 12.

After the customer selects electric motors, customer's computer 18 calls a sub-routine for electric motors at block 258 and displays various categories for inquiries about electric motors at block 260. Customer's computer 18 reads the selected category input at block 262 and decides whether or not a graphical query has been selected at block 264.

If a graphical query is selected, customer's computer 18 provides graphical information to the customer as illustrated at block 266. Illustratively, customer's computer displays drawings of an electric motor since electric motors were earlier selected by the customer. Customer's computer 18 then displays a scrolled box of selection criteria related to design characteristics of electric motors from which the customer can choose. For example, horsepower, FLRPM, voltage, torque, shaft diameter, shaft centerline dimension, etc. can be listed as design criteria. Customer's computer 18 then generates a query based on the selected design criteria. Using the answer provided by the customer, customer's computer 18 generates a list of electric motors which meet the selected design criteria. Customer's computer 18 then displays this generated list to assist the customer with his design.

If a graphical query was not selected, customer's computer 18 determines at block 268 whether or not the category of data sheet generation was selected. If data sheet generation was not selected, customer's computer 18 generates additional selection criteria such as performance data, dimensional data, or the like at block 270.

The present invention is concerned only with data sheet generation illustrated at block 268. Therefore, details of the graphical information in block 266 and the additional selection criteria in block 270 will not be provided. If the customer selects data sheet generation, a screen is displayed on customer's computer 18 that requires input of information as illustrated at block 272. The customer is prompted to enter the model number of the electric motor selected at block 274. Customer's computer 18 reads the input at block 276. Customer's computer 18 determines whether or not the escape key was pressed at block 278. If the escape key was pressed, customer's computer 18 returns to main menu 252 as illustrated at block 280. If the escape key was not pressed, customer's computer 18 compares the model number entered at block 274 with a valid model number table at block 282.

Customer's computer 18 then determines whether the model number entered is a valid number at block 284. If the model number entered is not valid, customer's computer 18 displays an error message at block 286 and waits for another model number to be input. If the correct model number has been entered, customer's computer 18 prompts the customer to enter a mounting position for the electric motor as illustrated at block 288 in FIG. 9. The selected mounting position input is read at block 290. Customer's computer 18 determines whether the escape key was pressed at block 292. If the escape key was pressed, customer's computer 18 exits and returns to main menu 252 as illustrated at block 294. If the escape key was not pressed, customer's computer 18 compares the mounting position entered at block 288 with a mounting position table at block 296. Customer's computer 18 determines whether the mounting position is valid at block 298. If the mounting position is not valid, customer's computer 18 generates an error message at block 300 and prompts the customer to enter a new mounting position. If the mounting position is valid, customer's computer 18 prompts the customer to enter further information at block 302. Specifically, the customer must enter the customer name, customer location, and remarks. Customer's computer 18 reads the information at block 304. Customer's computer 18 again determines whether the escape key was pressed at block 306. If the escape key was pressed, customer's computer 18 exits and returns to main menu 252 as illustrated at block 308.

Once all the data has been input, customer's computer 18 calls the communications and data handling functions as illustrated in block 116 of FIG. 4. The software in FIGS. 4-6 is used to link customer's computer 18 with vendor's computer 12 for both the software downloading and for the downloading of variable and constant catalog data. Customer's computer 18 dials vendor's computer 12 telephone number that was stored in the data file at the time of installation of the software. Messages are provided to inform the user of the status of the system. Communications errors are tested and the process will be aborted if any communications errors are detected as discussed in detail with reference to FIGS. 4-6. Once communication between customer's computer 18 and vendor's computer 12 has been established, vendor's computer 12 will transmit a log on and prompt to customer's computer 18.

Figure 10A:
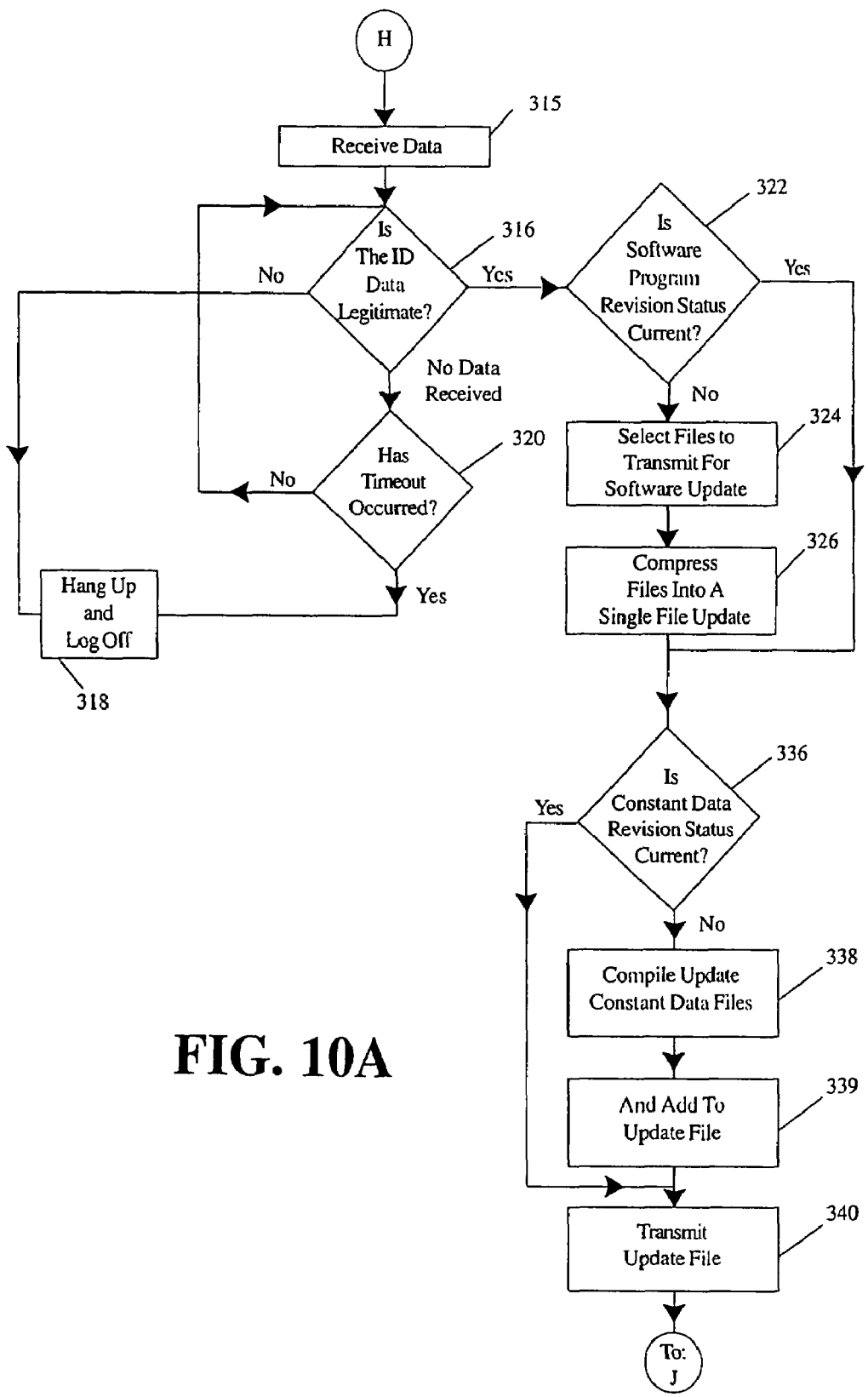
FIGS. 10A and 10B are flow charts illustrating the steps conducted by the electronic catalog system to check and update software on the customer's computer and to check and update constant data located on the customer's computer.
Figure 10B:
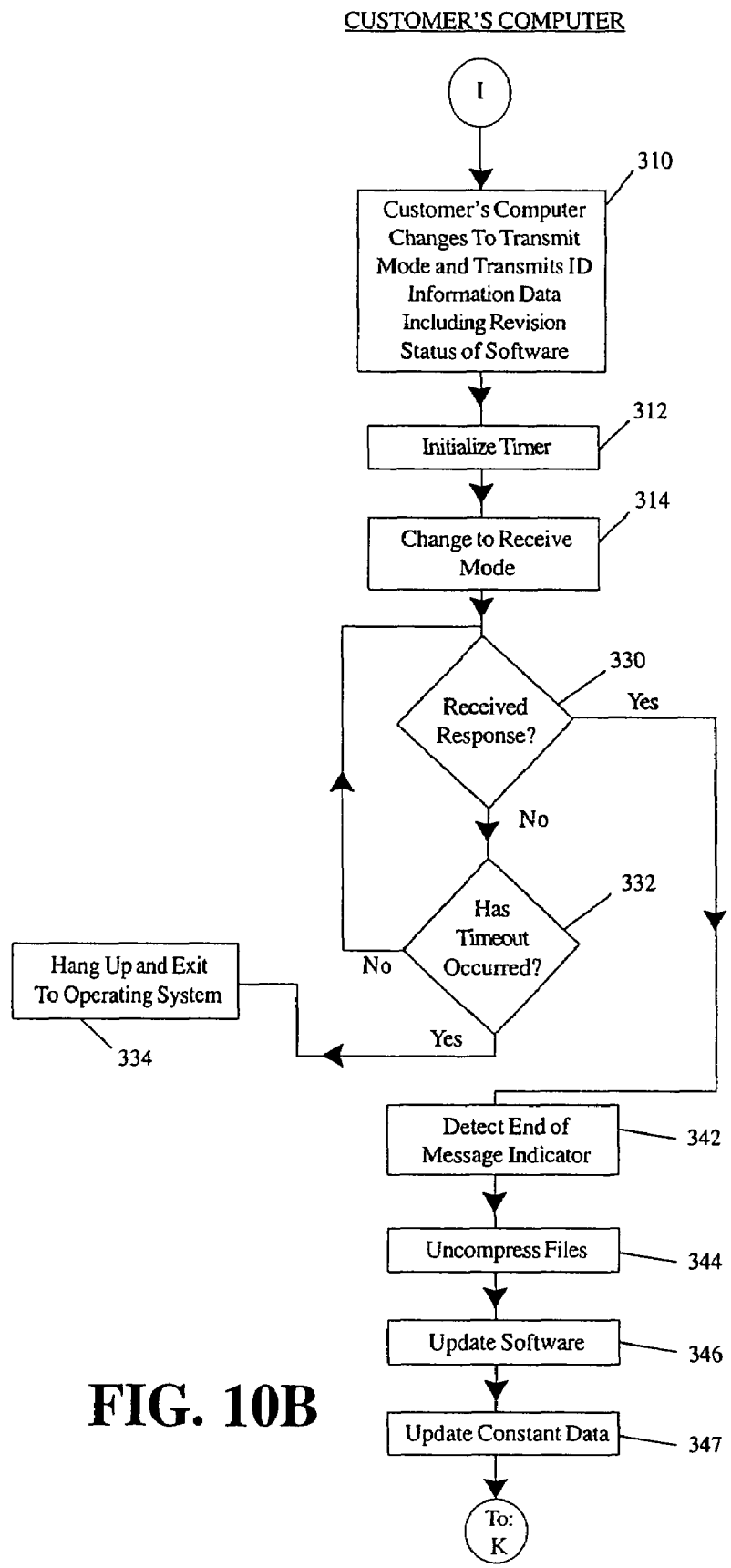
Figure 11A:
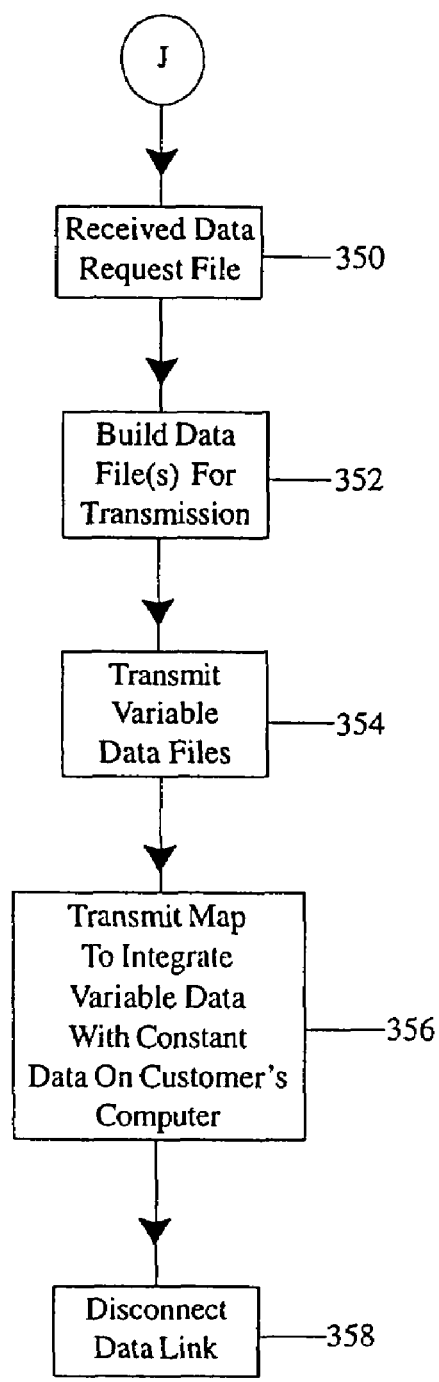
FIGS. 11A and 11B are flow charts illustrating the steps performed by the electronic catalog system during transmission of variable data from the vendor's computer to the customer's computer and during integration of the variable data requested with the constant data resident on the customer's computer.
Figure 11B:
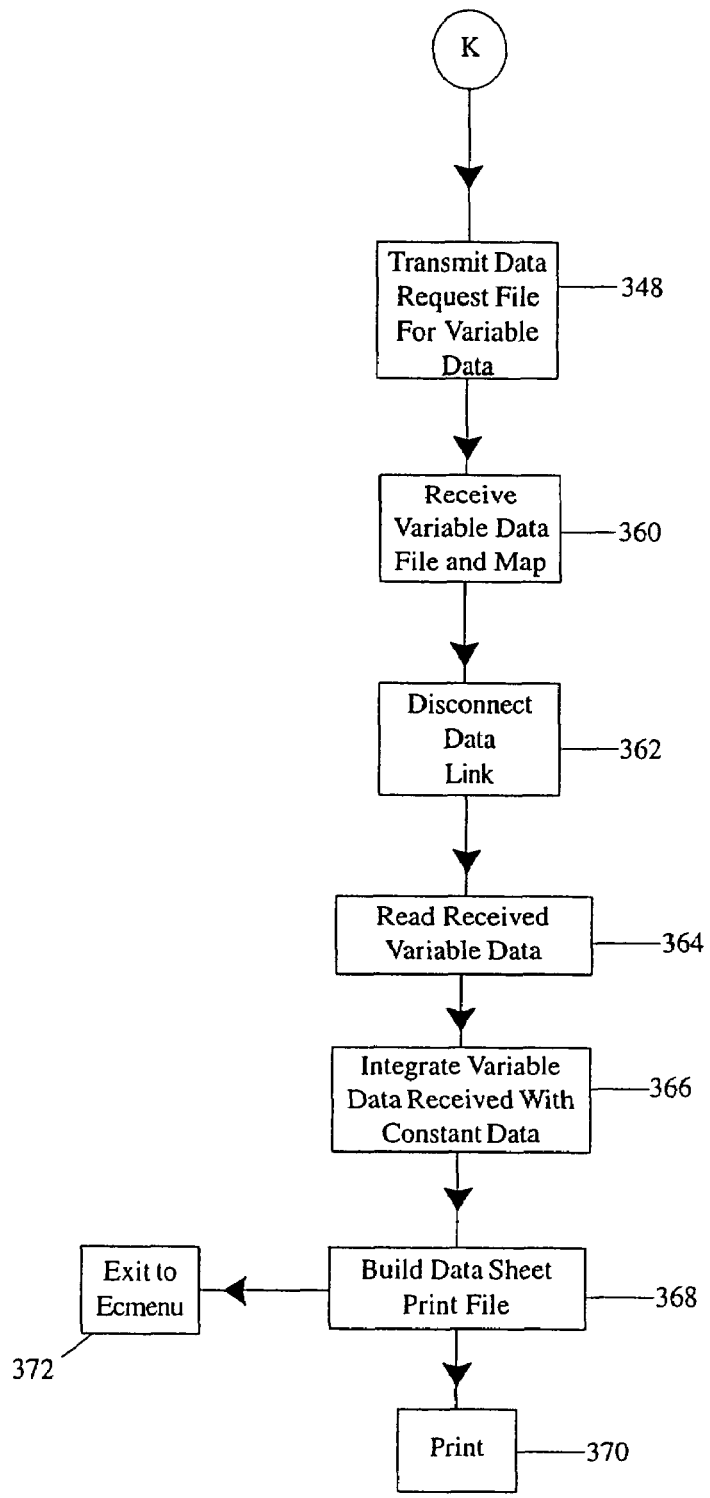

After customer's computer 18 and vendor's computer 12 complete the steps illustrated in FIGS. 4-6, vendor's computer 12 performs the steps beginning at location H in FIG. 10A and customer's computer 18 performs the steps beginning at location I in FIG. 10B. Customer's computer 18 changes to the transmit mode and transmits identification information including the revision status of the program or software and the revision status of constant data stored on customer's computer 18 as illustrated in block 310. The program or software revision status provides an indication of the last time the software was updated. The constant data revision status provides an indication of the last time the constant data was updated. Customer's computer 18 then initializes a timer at block 312 and changes to a receive mode at block 314. Vendor's computer 12 receives the identification data from customer's computer 18 at block 315. Vendor's computer 12 then checks to determine whether the identification data is legitimate at block 316. If the identification data is not legitimate, vendor's computer 12 transmits the message "Invalid Registration" to customer's computer 18, hangs up and logs off at block 318. If the identification data indicated that a pirated copy of the serialized program software had been detected, the serial number would be invalidated preventing future access by all copies of the software bearing this serial number. Vendor's computer 12 then transmits the message "Invalid Registration" to customer's computer 18 and hangs up and logs off at block 318. If vendor's computer 12 has not yet received the identification data, vendor's computer 12 determines whether a time out has occurred at block 320. If a time-out has not occurred, vendor's computer 12 waits an additional period of time to receive the identification data by returning to block 316. If a time-out has occurred, vendor's computer 12 hangs up and logs off at block 318.

If the identification data received from customer's computer 18 is legitimate, vendor's computer 12 determines whether the software revision status on customer's computer 18 is current at block 322. The software revision status received from customer's computer 18 is compared with the current revision status of the software on vendor's computer 12. For instance, the revision status could be the revision level of the software. If vendor's computer 12 determines that the software on customer's computer 18 needs to be updated, vendor's computer 12 selects the file or files that need to be transmitted to customer's computer 18 to bring customer's computer 18 up to date with the latest software revision level as illustrated at block 324. The software revision status reflects the status of the ECAT software as well as the support files at customer's computer 18. Vendor's computer 12 compresses the files into a single update file at block 326. If vendor's computer 12 determines that the software on customer's computer 18 is current, a dummy software update file is transmitted at block 340 from vendor's computer 12 to customer's computer 18. In other words, an update file is always transmitted from vendor's computer 12 to customer's computer 18. If a dummy update file is transmitted, no change in the revision status or the files is made at customer's computer 18. If there is a difference in the software revision status between customer's computer 18 and vendor's computer 12, the update file transmitted to customer's computer 18 contains all required update information including a new program or software revision status number.

Customer's computer 18 determines whether a response has been received to the identification data at block 330. If no response has been received, customer's computer 18 determines whether a time-out has occurred at block 332. If a time out has occurred, customer's computer 18 hangs up and exits to the operating system at block 334. If a time out has not occurred, customer's computer 18 waits for an additional period of time to receive a response from vendor's computer 12 by returning to block 330.

Vendor's computer 12 also checks the constant data revision status transmitted from customer's computer 18 to vendor's computer 12 at block 336. The constant data revision status received from customer's computer 18 is compared with the current revision status of the constant data on vendor's computer 12. For instance, the revision status could be the revision level of the constant data. If the revision status of the constant data is not current, vendor's computer 12 compiles updated constant data files at block 338, adds the updated constant data files to the update file block 339, and transmits the update file to customer's computer 18 at block 340. If the constant data revision status is the same as the revision status on vendor's computer 12, vendor's computer 12 does not the add constant data file to the update file. Instead, vendor's computer 12 skips to block 340 and transmits the update file to customer's computer 18. Customer's computer 18 detects the end of the data received from vendor's computer 12 at block 342.

The step of comparing the remote program revision status with the main program revision status in block 322 and the step of comparing the remote constant data revision status with the main constant data revising status in block 336 is a accomplished as follows. Each time the main program or the constant data stored in vendor's computer 12 is revised, a log of all changes that apply to a specific revision is kept. Starting with revision level 0, all software and constant data are the same on vendor's computer 12 and the customer's computer 18. When changes are made on vendor's computer 12 to either the constant data or software, the file names effected by the changes are kept in a revision data base and referenced to the next incremental update. When the revision data is sent from vendor's computer 12 to customer's computer 18, all the updated files are compressed into a single update file. The single update file is then downloaded from the vendor's computer 12 to customer's computer 18 when an update request is made as illustrated at block 340.

The update file is uncompressed at block 344 and distributed onto the customer's hard disk 36 into the appropriate sub-directories in blocks 346 and 347.

For illustrative purposes, an example of four revisions is provided below. The data base log of changes is stored in the following format:

| Revision Level | File Changed |
|---|---|
| 0 | All software and constant data is the same in vendor's computer 12 and customer's computer 18 |
| 1 | Data file #5 |
| 1 | Data file #28 |
| 1 | Program file #2 |
| 2 | Data file #17 |
| 3 | Program file #4 |
| 4 | Data file #5 (second revision) |
| 4 | Data file #6 |

In the illustrated example, a revision level change of 0 to 1 would include changes to Data files #5 and #28 and to Program file #2. These three files would be compressed into a single update file and transmitted from vendor's computer 12 to customer's computer 18 upon access of the vendor's computer 12 by customer's computer 18 as discussed above. Customer's computer 18 would then replace these three files stored on hard disk 36 with the updated files as discussed below.

If the software and constant data stored on customer's computer 18 is more then one revision level behind the software and constant data stored on vendor's computer 12, all of the files for all of the revisions that the customer requires to become updated are compressed into a single file and downloaded. Therefore, if a customer has not downloaded data for a period of time, that customer may have missed revisions 1, 2, 3 and 4. When the customer's computer 18 having a revision level of 0 does request data, if the current revision level is 4, vendor's computer 12 would transmit revisions 1, 2, 3 and 4 simultaneously to customer's computer 18. In other words, Data files 5, 28, 17, 5 (second revision), and 6 as well Program files 2 and 4 would be compressed into a single update file and transmitted from vendor's computer 12 to customer's computer 18.

Upon receipt of the data from vendor's computer 12, customer's computer 18 determines if the software update file is a dummy file or if there is valid update information. If valid update information exists, customer's computer 18 will replace and/or modify the file or files affected by the revision. Specifically, customer's computer 18 uncompresses the update files at block 344 and replaces existing files with the updated files. This includes both software updates and constant data updates. Customer's computer 18 replaces stored files with the updated data files and program files received from vendor's computer 12. After this update, the software on customer's computer 18 and the constant data on customer's computer 18 is updated with the most recent current update available at vendor's computer 12. The software is updated at block 346 and the constant data is updated at block 347.

After the software and constant data are updated, customer's computer 18 transmits a variable data request file to vendor's computer 12 at block 348. Vendor's computer 12 receives the data request file at block 350 and builds a data file for transmission of variable data at block 352. Vendor's computer 12 transmits the variable data files at block 354 and also transmits a map to permit customer's computer 18 to integrate the variable data with constant data on customer's computer 18 as illustrated at block 356.

The following is a description of the "map" created by vendor's computer 12 to permit customer's computer 18 to integrate both constant and variable data into a single data sheet. An example for the electric motor data sheet generation is as follows:

The creation of an electric motor data sheet requires the combination of 14 separate data files, displayed graphically, and positioned and scaled properly. These files can be grouped as text or graphical data, and also by whether the files reside locally on the customer's computer 18, or are downloaded from the vendor's computer 12 each time a data sheet is created. The specific process for generating a data sheet consists of two distinct steps. The first step is to process the data and select or generate the required display files, and the second step is to actually display the data, either on the screen or on a printer. The display files must be in one of two forms, either graphical (<File>.BID), or textual (<File>.TXT) with an accompanying location file (<File>.XY). The files are either downloaded (variable data) from vendor's computer 12, or are already resident (constant data) on customer's computer 18. All the files are in the proper format. The exception is the Dimensional Data. Dimensional Data is downloaded as text data, but must be processed to create a graphics file in order to display the borders around the text. A sub-program processes the file FRAME.TMP to create the file FRAME.BID which then becomes one of the graphics files to be displayed. This is an example of parametrics design.

The actual display of the data involves the use of a definition file (<File>.DEF). This file is the "map" that provides the instructions required to integrate all of the data on customer's computer 18. The definition file is an ASCII text file in which each line of text refers to one specific display file, and the manner in which it is to be displayed. The structure is as follows:

```
                   DEFINITION OF "MAP" FILE

File Type Flag, B for .BID graphical data, T for text on screen &
|              printer and S for text to screen only.
|   X1  Y1 - lower left corner
|   |   |
|   |   |   X2      Y2 - Upper right corner
|   |   |   |       |
|   |   |   |       |    .BID or .TXT file name
|   |   |   |       |    |
|   |   |   |       |    |   .XY file for text display,
|   |   |   |       |    |   | Justification flag,
|   |   |   |       |    |   | for text in .BID file
|   |   |   |       |    |   |   (L,C,R)
|   |   |   |       |    |   |
|   |   |   |       |    |   |
|   |   |   |       |    |   |
B   0   100 22000   31000 fire22  NULL
S   0   100 22000   31000 instr   instfire
```

For a graphics file, no .XY file is required. The format of the .XY file for text display is as follows:

The first 3 fields (x, y, ht) are required, the other fields will default if not defined in the .XY file.

To display a data sheet, the program reads the definition file ("map") one line at a time, calculates a scale factor and positional offsets based on the X1/Y1 and X2/Y2 values listed, and the resolution of the output device. The program then reads and displays the appropriate graphics file (<File>.BID) or text file (<File>.TXT), applying those scale factors and offsets.

After this information is transmitted, vendor's computer 12 automatically logs off and disconnects the data link at block 358. Customer's computer 18 receives the data files from vendor's computer 12 at block 360. Customer's computer 18 then automatically disconnects the data link at block 362.

Customer's computer 18 reads the received variable data at block 364 and integrates the variable data received with the constant data on customer's computer 18 at block 366 according to the map provided by vendor's computer 12. Customer's computer 18 then builds a data sheet print file at block 368 using the integrated constant data and variable data. Therefore the data sheet includes accurate data having the most recent update included on vendor's computer 12. At this point, a customer can print a data sheet on printer 24 as illustrated at block 370 or exit back to the main menu at block 372.

Although the invention has been described in detail with reference to a certain preferred embodiment, variations and modifications exist within the scope and spirit of the invention as described and defined in the following claims.

What is claimed is:

1. A method for detecting pirated copies of a serialized software program located on a remote computer including a remote memory for storing a program, a remote revision level, and a program serial number, the method comprising:
    providing a main computer including a main memory for storing the program serial number, the remote revision level corresponding to the program serial number, and a validation code for a remote program corresponding to the serial number, the validation code indicating whether the program stored in the remote memory is valid or invalid;
    receiving at the main computer the remote revision level and the program serial number stored in the remote memory transmitted from the remote computer to the main computer;
    comparing the remote program revision level received from the remote computer to the remote program revision level stored in the main memory corresponding to the program serial number received from the remote computer;
    changing the validation code to indicate the serial number is invalid upon detection in the comparing step of a difference between the remote program revision level received from the remote computer and the remote program revision level stored in the memory of the main computer corresponding to the program serial number received from the remote computer;
    detecting whether the program stored in the remote memory is valid or invalid based upon the validation code corresponding to the program serial number received from the remote computer; and
    denying access to data stored in the memory of the main computer when the program corresponding to the serial number stored in the remote memory is invalid.

2. The method of claim 1, further comprising:
    storing the latest revisions of the program and a main program revision level in the memory of the main computer;
    determining updated portions of the program stored in the main computer that are different from the program stored in the remote computer; and
    transmitting the updated portions from the main computer to the remote computer to permit replacing portions of the program stored in the memory of the remote computer with the updated portions received from the main computer.

3. The method of claim 2, further comprising:
    replacing the remote program revision level corresponding to the program serial number stored in the main memory with the main program revision level after the updated portions of the program are transmitted to the remote computer;
    transmitting the main program revision level to the remote computer; and
    replacing the remote program revision level stored in the remote memory with the main program revision level.

4. The method of claim 1, wherein the revision level is an integer.

5. The method of claim 1, wherein the revision level provides an indication of the program files changed on the main computer.

6. The method of claim 1, wherein the revision level provides an indication of data files changed in the memory of the main computer.

7. The method of claim 1, further comprising transmitting data from the main computer to the remote computer when the program corresponding to the serial number stored in the remote memory is determined to be valid during the detecting step.

8. The method of claim 7, wherein the data is transmitted from the main computer in an update file.

9. The method of claim 7, wherein the data is electronic catalog data related to at least one product.

10. The method of claim 1, wherein the denying step denies access to data stored in the memory of the main computer for all programs having the same invalid serial number.

11. The method of claim 1, wherein the main computer is a single computer.

12. A method for detecting pirated copies of a software program located on a remote computer including a remote memory for storing a program, a remote revision level, and a program serial number from a main computer including a main memory for storing the program serial number, the remote revision level corresponding to the program serial number, and a validation code for a remote program corresponding to the serial number, the validation code indicating whether the program stored in the remote memory is valid or invalid, the method comprising the steps of:
    receiving at the main computer the remote revision level and the program serial number stored in the remote memory from the remote computer;
    comparing the remote program revision level received from the remote computer to the remote program revision level corresponding to the program serial number received from the remote computer stored in the main memory;
    changing the validation code to indicate the serial number is invalid upon detection during the comparing step of a difference between the remote program revision level received from the remote computer and the remote program revision level stored in the memory of the main computer corresponding to the program serial number received from the remote computer;
    detecting whether the program stored in the remote memory is valid or invalid based upon the validation code corresponding to the program serial number received from the remote computer; and
    denying access to data stored in the memory of the main computer when the program corresponding to the serial number stored in the remote memory is invalid.

13. The method of claim 12, further comprising the steps of:
- storing product data related to a plurality of products in a memory of the main computer;
- transmitting a first subset of product data related to a plurality of products from the main computer to the remote computer for storage in the remote memory of the remote computer; and
- receiving a data request query related to at least one selected product at the main computer from the remote computer.

14. The method of claim 13, further comprising the steps of:
- executing the data request query at the main computer to generate a second subset of product data related to the selected product from the data stored in the memory of the main computer; and
- transmitting the second subset of product data from the main computer to the remote computer.

15. The method of claim 14, further comprising the step of transmitting a map from the main computer to the remote computer along with the second subset of product data to instruct the remote computer in the integration of the first and second subsets of product data.

16. The method of claim 12, further comprising:
- storing the latest revisions of the program and a main program revision level in the memory of the main computer;
- determining updated portions of the program stored in the main computer that are different from the program stored in the remote computer; and
- transmitting the updated portions from the main computer to the remote computer to permit replacing portions of the program stored in the memory of the remote computer with the updated portions received from the main computer.

17. The method of claim 16, further comprising:
- replacing the remote program revision level corresponding to the program serial number stored in the main memory with the main program revision level after the updated portions of the program are transmitted to the remote computer;
- transmitting the main program revision level to the remote computer; and
- replacing the remote program revision level stored in the remote memory with the main program revision level.

18. The method of claim 12, wherein the revision level is an integer.

19. The method of claim 12, wherein the revision level provides an indication of the program files changed on the main computer.

20. The method of claim 12, wherein the revision level provides an indication of data files changed in the memory of the main computer.

21. The method of claim 12, further comprising transmitting data from the main computer to the remote computer when the program corresponding to the serial number stored in the remote memory is determined to be valid during the detecting step.

22. The method of claim 12, wherein the data is electronic catalog data related to at least one product.

23. The method of claim 12, wherein the main computer is a single computer.

24. A computer readable medium having computer executable instructions which when executed by a main computer processor and remote computer processor perform a method, wherein a serialized software program is located on the remote computer including a remote memory for storing a program, a remote revision level, and a program serial number, the method comprising of the steps:
- providing the main computer including a main memory for storing the program serial number, the remote revision level corresponding to the program serial number, and a validation code for a remote program corresponding to the serial number, the validation code indicating whether the program stored in the remote memory is valid or invalid;
- receiving at the main computer the remote revision level and the program serial number stored in the remote memory transmitted from the remote computer to the main computer;
- comparing the remote program revision level received from the remote computer to the remote program revision level stored in the main memory corresponding to the program serial number received from the remote computer;
- changing the validation code to indicate the serial number is invalid upon detection in the comparing step of a difference between the remote program revision level received from the remote computer and the remote program revision level stored in the memory of the main computer corresponding to the program serial number received from the remote computer;
- detecting whether the program stored in the remote memory is valid or invalid based upon the validation code corresponding to the program serial number received from the remote computer; and
- denying access to data stored in the memory of the main computer when the program corresponding to the serial number stored in the remote memory is invalid.

25. A computer readable medium having computer executable instructions which when executed by a main computer processor and a remote computer processor perform a method, wherein the remote computer including a remote memory for storing a program, a remote revision level, and a program serial number, the main computer including a main memory for storing the program serial number, the remote revision level corresponding to the program serial number, and a validation code for a remote program corresponding to the serial number, the validation code indicating whether the program stored in the remote memory is valid or invalid, the method comprising the steps of:
- receiving at the main computer the remote revision level and the program serial number stored in the remote memory from the remote computer;
- comparing the remote program revision level received from the remote computer to the remote program revision level corresponding to the program serial number received from the remote computer stored in the main memory;
- changing the validation code to indicate the serial number is invalid upon detection during the comparing step of a difference between the remote program revision level received from the remote computer and the remote program revision level stored in the memory of the main computer corresponding to the program serial number received from the remote computer;
- detecting whether the program stored in the remote memory is valid or invalid based upon the validation code corresponding to the program serial number received from the remote computer; and
- denying access to data stored in the memory of the main computer when the program corresponding to the serial number stored in the remote memory is invalid.

* * * * *